(12) United States Patent
Ikegami et al.

(10) Patent No.: US 7,412,836 B2
(45) Date of Patent: *Aug. 19, 2008

(54) HUMIDITY CONTROL DEVICE

(75) Inventors: Shuji Ikegami, Osaka (JP); Takahisa Sueoka, Osaka (JP); Tomohiro Yabu, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 165 days.

This patent is subject to a terminal disclaimer.

(21) Appl. No.: 10/547,938

(22) PCT Filed: Mar. 9, 2004

(86) PCT No.: PCT/JP2004/003047

§ 371 (c)(1),
(2), (4) Date: Sep. 8, 2005

(87) PCT Pub. No.: WO2004/081459

PCT Pub. Date: Sep. 23, 2004

(65) Prior Publication Data

US 2006/0179862 A1     Aug. 17, 2006

(30) Foreign Application Priority Data

Mar. 10, 2003    (JP) .............................. 2003-063193

(51) Int. Cl.
*F25D 17/06*     (2006.01)
*F25D 21/00*     (2006.01)

(52) U.S. Cl. ............................................. 62/94; 62/272

(58) Field of Classification Search ..................... 62/92, 62/93, 94, 100, 106, 271, 476, 478, 480, 62/272; 96/127
See application file for complete search history.

(56) References Cited

U.S. PATENT DOCUMENTS 1,865,349 A * 6/1932 Wright ........................ 62/143
(Continued)

FOREIGN PATENT DOCUMENTS

JP          5-118695 A * 5/1993
(Continued)

*Primary Examiner*—Mohammad M. Ali
(74) *Attorney, Agent, or Firm*—Birch, Stewart, Kolasch, & Birch, LLP

(57) ABSTRACT

A humidity controller apparatus comprises: a first heat exchange chamber (69) for accommodating a first heat exchanger (3), an adsorbent material being supported on a surface of said first heat exchanger (3); and a second heat exchange chamber (73), formed adjacently to said first heat exchange chamber (69), for accommodating a second heat exchanger (5), an adsorbent material being supported on a surface of said second heat exchanger (5). A first air inflow passage (63) and a first air outflow passage (65) are formed along one end surface in a thickness direction in which respective one surfaces of said two heat exchange chambers (69, 73) continue and which are arranged in a superimposed manner in the thickness direction of both said heat exchange chambers (69, 73). A second air inflow passage (57) and a second air outflow passage (59) are formed along another end surface which is an end surface where respective one surfaces of said two heat exchange chambers (69, 73) continue and which is situated face to face with said one end surface, and which are arranged in a superimposed manner in the thickness direction of both said heat exchange chambers (69, 73). Opening/closing means (35, . . . , 47, . . . ) are provided for opening and closing openings (31*a*, . . . , 33*a*, . . . ) for communication between said first heat exchange chamber (69) and said second heat exchange chamber (73), and each said inflow passage (57, 63) and each said outflow passage (59, 65).

7 Claims, 13 Drawing Sheets

U.S. PATENT DOCUMENTS

| | | | | |
|---|---|---|---|---|
| 4,881,376 A | * | 11/1989 | Yonezawa et al. | 62/106 |
| 5,005,371 A | * | 4/1991 | Yonezawa et al. | 62/238.6 |
| 5,588,988 A | * | 12/1996 | Gerstel et al. | 96/101 |
| 5,658,369 A | * | 8/1997 | Kusay | 95/41 |
| 5,732,569 A | * | 3/1998 | Sanada et al. | 62/481 |
| 5,837,039 A | * | 11/1998 | LeConey et al. | 96/121 |
| 5,914,456 A | * | 6/1999 | LeConey et al. | 96/121 |
| 6,041,617 A | * | 3/2000 | Sanada et al. | 62/480 |
| 6,152,990 A | * | 11/2000 | Allen et al. | 95/90 |
| 6,468,334 B2 | * | 10/2002 | Incorvia et al. | 96/147 |

FOREIGN PATENT DOCUMENTS

| | | |
|---|---|---|
| JP | 7-000755 A | 1/1995 |
| JP | 07265649 A | 10/1995 |
| JP | 8-189667 A | 7/1996 |
| JP | 9-210367 A | 8/1997 |
| JP | 09229444 A | 9/1997 |
| JP | 2002224529 | 8/2002 |
| JP | 2003-035436 A | 2/2003 |

* cited by examiner

FIG. 17

| | HUMIDITY CONTROLLER OF PRESENT EMBODIMENT | | CONVENTIONAL HUMIDITY CONTROLLER | |
|---|---|---|---|---|
| | OUTDOOR AIR (ADSORPTION (DEHUMIDIFICATION) SIDE) | DESORPTION (REGENERATION) SIDE | OUTDOOR AIR (ADSORPTION (DEHUMIDIFICATION) SIDE) | DESORPTION (REGENERATION) SIDE |
| INLET TEMPERATURE (°C) | 34.8(①) | 27.2(③) | 34.6(⑤) | 49.0(⑦) |
| OUTLET TEMPERATURE (°C) | 28.1(②) | 39.9(④) | 37.3(⑥) | 38.7(⑧) |
| INLET HUMIDITY (g/kg-DA) | 13.9(①) | 10.5(③) | 15.2(⑤) | 10.1(⑦) |
| OUTLET HUMIDITY (g/kg-DA) | 9.2(②) | 15.0(④) | 12.7(⑥) | 12.3(⑧) |
| COOLING TEMPERATURE (°C) | ABOUT 20 | — | ABOUT 28 | — |
| HEATING TEMPERATURE (°C) | — | ABOUT 47 | — | ABOUT 49 |

HUMIDITY CONTROL DEVICE

TECHNICAL FIELD

The present invention generally relates to a humidity controller apparatus and specifically to an air distribution mechanism.

BACKGROUND ART

Conventionally, humidity controller apparatuses for regulating the humidity of air by making use of an adsorbent material have been known in the prior art. One such humidity controller apparatus is disclosed in Japanese Patent Application Kokai Publication No. 1996-189667.

This humidity controller apparatus has an air passage through which a stream of outdoor or room air flows and passes. And, a section of the piping of a refrigerant circuit which performs a vapor compression refrigeration cycle by the circulation of refrigerant is disposed in the inside of the air passage. This piping section in the air passage functions as an evaporator or as a condenser. In addition, disposed on the periphery of the piping in the air passage is a mesh member which is formed of a net-like member in which is encapsulated an adsorbent material.

The adsorbent material of the mesh container is cooled by a flow of refrigerant traveling through the piping section, when the piping section functions as an evaporator. By the action of such cooling, moisture present in the room or outdoor air is adsorbed via the net-like member. In addition, when the piping section functions as a condenser, moisture adsorbed onto the adsorbent material is desorbed when heated by the refrigerant flowing through the piping section. As a result, the adsorbent material is regenerated.

PROBLEMS THAT INVENTION INTENDS TO SOLVE

However, in the above-described conventional humidity controller apparatus, air distribution systems have not been considered at all, and size reduction has been demanded. That is, it is necessary to switch the air distribution systems between the case where the piping section functions as an evaporator and the case where the piping section functions as a condenser. Especially, continuous adsorption and regeneration of the adsorbent material requires more complicated air systems.

In the above-described conventional humidity controller apparatus, however, the piping as a means for cooling and heating air and the mesh container as a moisture-adsorbing means are formed and arranged separately. Therefore, the air flow systems become more complicated, and in addition, the size of the conventional humidity controller increases.

The present invention was conceived in view of the above problems. An object of the present invention is to improve the air systems for the purpose of downsizing.

DISCLOSURE OF INVENTION

As illustrated in FIG. 1, a first invention is directed to a humidity controller apparatus, provided with an adsorbent material, for regulating the humidity of air by effecting moisture adsorption onto the adsorbent material and moisture desorption from the adsorbent material. In the humidity controller apparatus of the first invention, there is provided a refrigerant circuit (1) which comprises a first heat exchanger (3) and a second heat exchanger (5); which performs a vapor compression refrigeration cycle by the circulation of a refrigerant theretbiough; and which alternately affects refrigerant condensation and evaporation in the first and second heat exchangers (3, 5). In addition, the adsorbent material, illustrated as element 14 in FIG. 2, is supported on at least a surface of the first heat exchanger (3).

In the first invention, the distribution of air of the first heat exchange chamber (69) and the second heat exchange chamber (73) is switched by opening/closing control by means of the opening/closing means (35, . . . , 47, . . . ). As the result of this, moisture absorption and moisture release are effected in the first and second heat exchange chambers (69, 73).

The second invention provides a humidity controller apparatus according to the first invention, wherein four openings (33*a*-33*d*) which allow communication between the first heat exchange chamber (69) and the second heat exchange chamber (73) and the first air inflow passage (63) and the first air outflow passage (65) are positioned in close proximity to one another in a matrix direction. Four openings (31*a*-31*d*) which allow communication between the first heat exchange chamber (69) and the second heat exchange chamber (73) and the second air inflow passage (57) and the second air outflow passage (59) are positioned in close proximity to one another in a matrix direction. The eight opening/closing means (35, . . . , 47, . . . ) are each formed by a damper.

In the second invention, the direction in which air is distributed is switched by opening/closing the eight dampers (35, . . . , 47, . . . ). As a result, moisture absorption and moisture release are realized in the first heat exchange chamber (69) and the second heat exchange chamber (73).

The third invention provides a humidity controller apparatus according to the first invention, wherein the first air inflow passage (63) and the first air outflow passage (65) are arranged symmetrically with the second air inflow passage (57) and the second air outflow passage (59).

In the third invention, the first air inflow passage (63), the first air outflow passage (65), the second air inflow passage (57), and the second air outflow passage (59) are placed in a compact arrangement, and the air distribution resistance is decreased.

The fourth invention provides a humidity controller apparatus according to the first invention, wherein the first heat exchanger (3) and the second heat exchanger (5) are provided in a refrigerant circuit (1) which performs a vapor compression refrigeration cycle by the circulation of a refrigerant therethrough such that refrigerant condensation and evaporation alternately occur in the first heat exchanger (3) and the second heat exchanger (5).

In the fourth invention, moisture absorption and regeneration of the adsorbent material are realized by refrigerant condensation and evaporation occurring in the first heat exchanger (3) and the second heat exchanger (5).

The fifth invention provides a humidity controller apparatus according to the fourth invention, wherein dehumidifier means (80) for switching refrigerant circulation in the refrigerant circuit (1) and air distribution is provided so that moisture in a stream of air flowing through a refrigerant evaporating heat exchanger (3, 5) is adsorbed by the adsorbent material of the refrigerant evaporating heat exchanger (3, 5) while the adsorbent material of a refrigerant condensing heat exchanger (5, 3) is regenerated by the release of moisture therefrom to a stream of air flowing through the refrigerant condensing heat exchanger (5, 3), whereby the stream of air dehumidified by the adsorbent material of the refrigerant evaporating heat exchanger (3, 5) is supplied to an indoor space.

In the fifth invention, the dehumidifier means (80) switches refrigerant circulation in the refrigerant circuit (1) and air distribution, whereby air dehumidification takes place in one heat exchanger (i.e., the refrigerant evaporating heat exchanger (3, 5)) and adsorbent-material regeneration takes place in the other heat exchanger (i.e., the refrigerant condensing heat exchanger (5, 3)). As the result of this, dehumidification is carried out without interruption.

The sixth invention provides a humidity controller apparatus according to the fourth invention, wherein humidifier means (81) for switching refrigerant circulation in the refrigerant circuit (1) and air distribution is provided so that moisture in a stream of air flowing through a refrigerant evaporating heat exchanger (3, 5) is adsorbed by the adsorbent material of the refrigerant evaporating heat exchanger (3, 5) while the adsorbent material of a refrigerant condensing heat exchanger (5, 3) is regenerated by the release of moisture therefrom to a stream of air flowing through the refrigerant condensing heat exchanger (5, 3), whereby the stream of air humidified by the adsorbent material of the refrigerant evaporating heat exchanger (5, 3) is supplied to an indoor space.

In the sixth invention, humidifier means (81) switches refrigerant circulation in the refrigerant circuit (1) and air distribution, whereby air dehumidification takes place in one heat exchanger (i.e., the refrigerant evaporating heat exchanger (3, 5)) and air humidification takes place in the other heat exchanger (i.e., the refrigerant condensing heat exchanger (5, 3)) and the adsorbent material thereof is regenerated. As the result of this, humidification is carried out without interruption.

The seventh invention provides a humidity controller apparatus according to the fourth invention, wherein dehumidifier means (80) for switching refrigerant circulation in the refrigerant circuit (1) and air distribution is provided so that moisture in a stream of air flowing through a refrigerant evaporating heat exchanger (3, 5) is adsorbed by the adsorbent material of the refrigerant evaporating heat exchanger (3, 5) while the adsorbent material of a refrigerant condensing heat exchanger (5, 3) is regenerated by the release of moisture therefrom to a stream of air flowing through the refrigerant condensing heat exchanger (5, 3), whereby the stream of air dehumidified by the adsorbent material of the refrigerant evaporating heat exchanger (3, 5) is supplied to an indoor space. Humidifier means (81) for switching refrigerant circulation in the refrigerant circuit (1) and air distribution is provided so that moisture in a stream of air flowing through a refrigerant evaporating heat exchanger (3, 5) is adsorbed by the adsorbent material of the refrigerant evaporating heat exchanger (3, 5) while the adsorbent material of a refrigerant condensing heat exchanger (5, 3) is regenerated by the release of moisture therefrom to a stream of air flowing through the refrigerant condensing heat exchanger (5, 3), whereby the stream of air humidified by the adsorbent material of the refrigerant evaporating heat exchanger (5, 3) is supplied to an indoor space. The dehumidifier means (80) and the humidifier means (81) are configured to operate switchably between a dehumidification mode of operation and a humidification mode of operation.

In the seventh invention, the dehumidifier means (80) switches refrigerant circulation in the refrigerant circuit (1) and air distribution, whereby air dehumidification takes place in one heat exchanger (i.e., the refrigerant evaporating heat exchanger (3, 5)) and adsorbent-material regeneration takes place in the other heat exchanger (i.e., the refrigerant condensing heat exchanger (5, 3)). As the result of this, dehumidification is carried out without interruption. In addition, when switched to the humidifier means (81), refrigerant circulation in the refrigerant circuit (1) and air distribution are switched. Then, air dehumidification takes place in one heat exchanger (i.e., the heat exchanger (3, 5)) and air humidification takes place in the other heat exchanger (i.e., the heat exchanger (5, 3)) and the adsorbent material thereof is regenerated. As the result of this, humidification is carried out without interruption.

EFFECTS OF INVENTION

Thus, in accordance with the first invention, it is arranged that: the first heat exchange chamber (69) and the second heat exchange chamber (73) are adjacently arranged; the inflow passages (57, 63) and the outflow passages (59, 65) are arranged in a superimposed manner in the thickness direction of the first and second heat exchange chambers (69, 73). This provides a downsized humidity controller apparatus. That is, air distribution systems are made simple in construction and the reduction of size is achieved.

Further, it is arranged that adsorbent materials are supported on the surfaces of the first and second heat exchangers (3) and (5), thereby allowing integral formation of a heating/cooling means and an adsorption/desorption means. Such an arrangement makes it possible to provide dehumidification and humidification with the omission of an adsorbent-material container. This results in a reduction in the number of component parts, thereby making it possible to provide not only a simplified structure but also a downsized humidity controller apparatus.

Furthermore, it is arranged that adsorbent materials are supported on the surfaces of the first and second heat exchangers (3) and (5). Such an arrangement makes it possible to allow the refrigerant to directly cool or heat the adsorbent materials. As the result of this, the adsorption/desorption performance of the adsorbent materials is brought to a maximum. This makes it possible to improve the efficiency of adsorption/desorption and to provide a downsized humidity controller apparatus.

In accordance with the second invention, the openings (31*a*-31*d*, 33*a*-33*d*) are positioned in close proximity to one another in a matrix direction and are opened/closed by the dampers (35, . . . , 47, . . . ), respectively. Accordingly, air distribution systems are made simple in construction and the reduction of size is achieved.

In accordance with the third invention, the first inflow and outflow passages (63, 65) are arranged symmetrically with the second inflow and outflow passages (57, 59). Therefore, the distribution resistance is reduced. As a result, it is possible to perform dehumidification and other like operation with high efficiency.

In accordance with the fourth invention, the vapor compression refrigeration cycle refrigerant circuit (1) is employed. Therefore, the adsorption and regeneration of adsorbent materials are carried out with high efficiency.

In accordance with the fifth or sixth invention, it is possible to continuously perform a dehumidification operation or a humidification operation with the omission of an adsorbent material container. This reduces the number of component parts, thereby making it possible to provide not only a simplified structure but also a downsized humidity controller apparatus. Besides, a dehumidification operation or a humidification operation are performed with high efficiency.

In accordance with the seventh invention, the operation is continued by switching between dehumidification and humidification. This reduces the number of component parts, thereby making it possible to provide not only a simplified structure but also a downsized humidity controller apparatus. Besides, dehumidification or humidification is provided with high efficiency.

BRIEF DESCRIPTION OF DRAWINGS

FIG. 17 is a table showing respective data of the humidity controller apparatus of the present embodiment and the conventional humidity controller apparatus during dehumidification operation.

BEST MODE FOR CARRYING OUT INVENTION

Hereinafter, an embodiment of the present invention will be described in detail with reference to the drawings.

As shown in FIGS. 1-5, a humidity controller apparatus of the present embodiment effects room-air dehumidification and humidification, and has a hollow, rectangular parallelepiped box-like casing (17). The casing (17) accommodates a refrigerant circuit (1) and other component parts.

Figure 1:
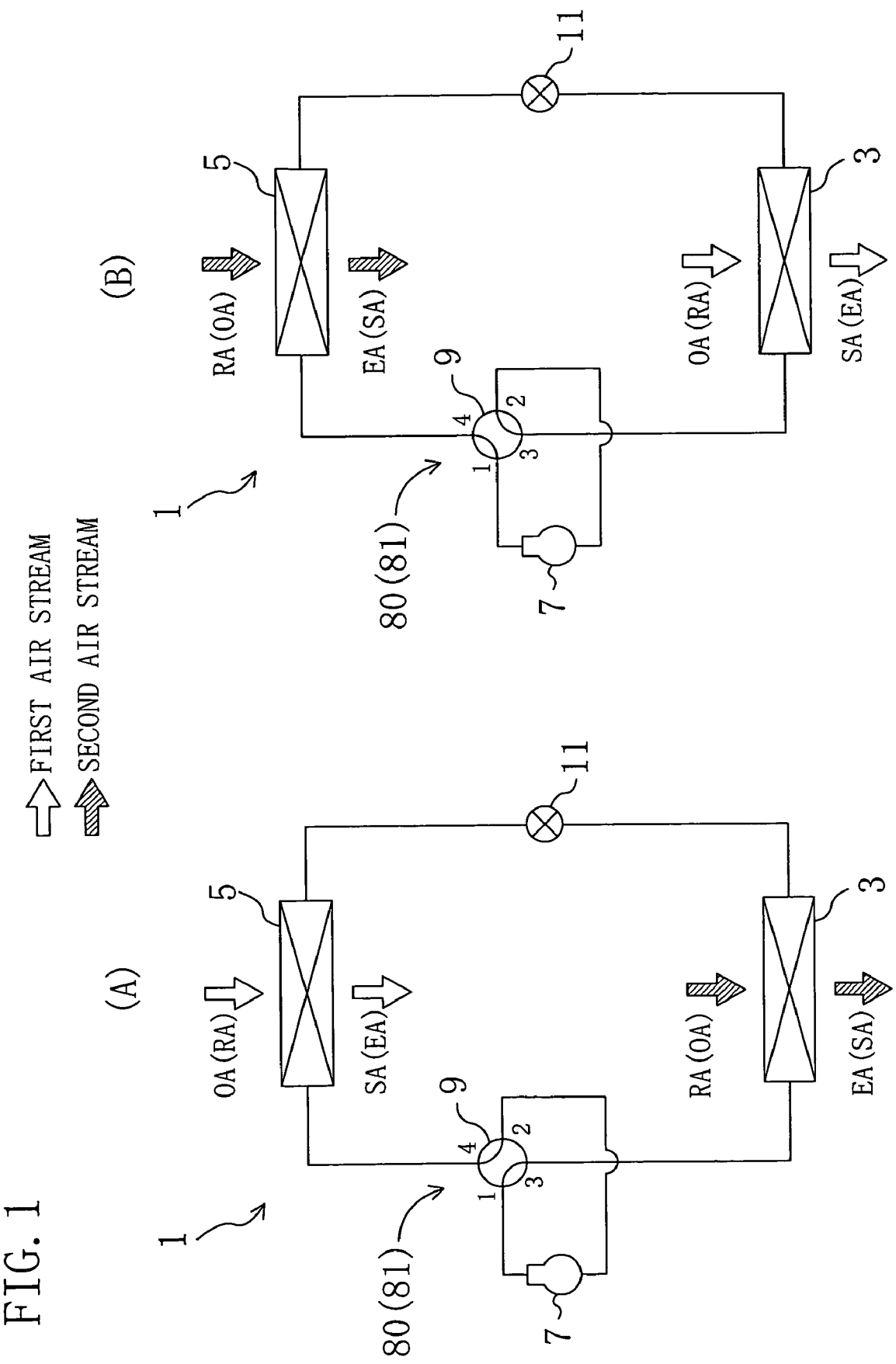
FIG. 1 is a circuit diagram showing a refrigerant circuit of a humidity controller apparatus according to an embodiment of the present invention.

Referring to FIG. 1, the refrigerant circuit (1) is a closed circuit formed by a sequential connection of a compressor (7), a four-way switching valve (9) which is a flow path switching means, a first heat exchanger (3) which is a first heat exchanger, an expansion valve (11) which is an expansion mechanism, and a second heat exchanger (5) which is a second heat exchanger.

In addition, the refrigerant circuit (1) is charged with a refrigerant. The refrigerant circuit (1) is configured, such that a vapor compression refrigeration cycle is performed by the circulation of the refrigerant therethrough.

One end of the first heat exchanger (3) is connected to the four-way switching valve (9). The other end of the first heat exchanger (3) is connected to one end of the second heat exchanger (5) via the expansion valve (11). The other end of the second heat exchanger (5) is connected to the four-way switching valve (9).

Figure 2:
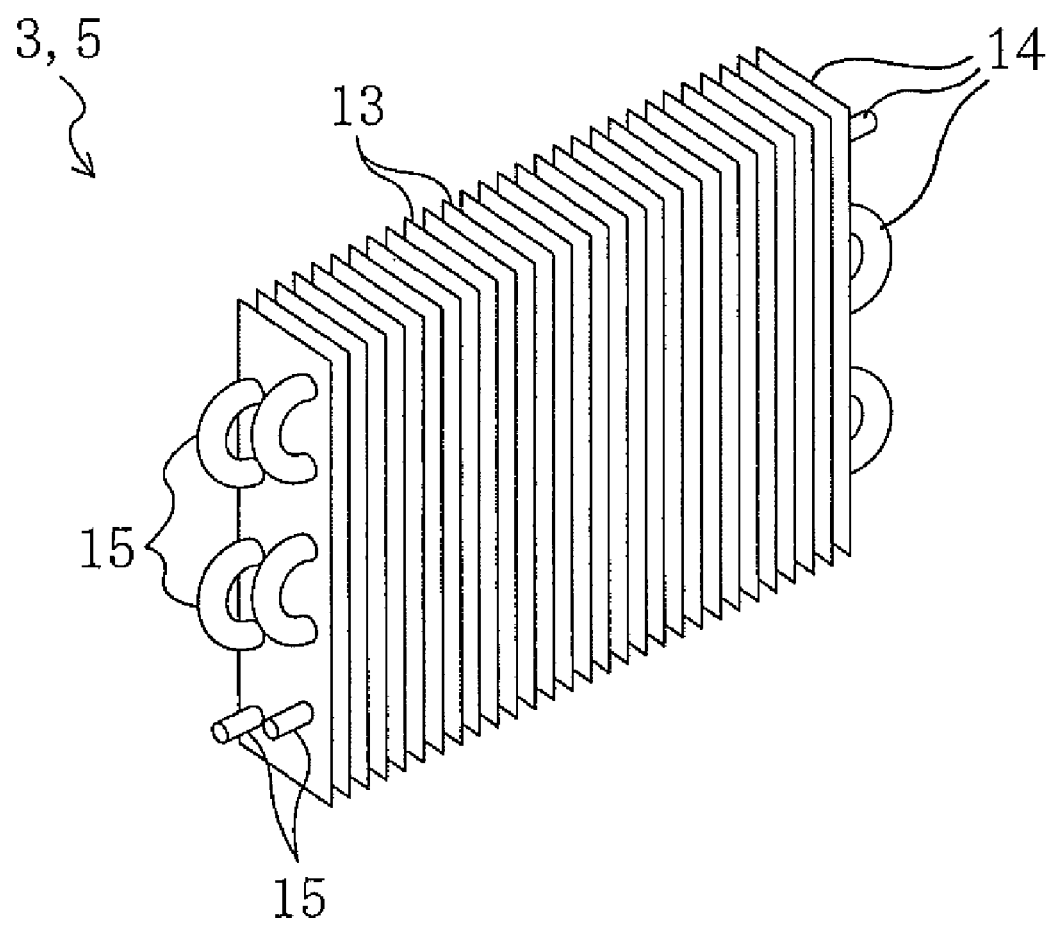
FIG. 2 is a perspective view of a heat exchanger according to the embodiment of the present invention.

With reference to FIG. 2, the first heat exchanger (3) and the second heat exchanger (5) are each formed by a respective fin and tube heat exchanger of the cross fin type. More specifically, each of the first and second heat exchangers (3) and (5) is provided with a large number of aluminum fins (13) each shaped like a rectangular plate and copper heat transfer tubes (15) which penetrate the fins (13).

An adsorbent material is supported by means of dip forming (immersion forming) on the external surface of each fin (13) as well as on the external surface of each heat transfer tube (15).

As the adsorbent material, zeolite, silica gel, activated carbon, materials selected from the organic polymer family having hydrophilic properties or water-absorbing properties, materials selected from the ion-exchange resin family having carboxylic acid group or sulfonic acid group, and functional polymeric materials such as temperature-sensitive polymers may be used.

In the present embodiment, the first heat exchanger (3) and the second heat exchanger (5) are fin and tube heat exchangers of the cross fin type. Alternatively, different types of heat exchangers may be employed. For example, heat exchangers of the corrugated fin type may be used.

In addition, in the present embodiment, the adsorbent material is supported, by means of dip forming, on the external surface of each of the fins (13) and on the external surface of each of the heat transfer tubes (15). Alternatively, the adsorbent material may be supported on the external surfaces by any other techniques as long as its ability to provide adsorption is not reduced.

The four-way switching valve (9) is so configured as to switch between a first state that allows communication between the first and third ports and, at the same time, communication between the second and fourth ports (as indicated in FIG. 1(A)), and a second state that allows communication between the first and fourth ports and, at the same time, communication between the second and third ports (as indicated in FIG. 1(B)). And, the four-way switching valve (9) is switched for establishing a switch between a first operation in which the first heat exchanger (3) functions as a condenser while, simultaneously, the second heat exchanger (5) functions as an evaporator and a second operation in which the second heat exchanger (5) functions as a condenser while, simultaneously, the first heat exchanger (3) functions as an evaporator.

Figure 3:
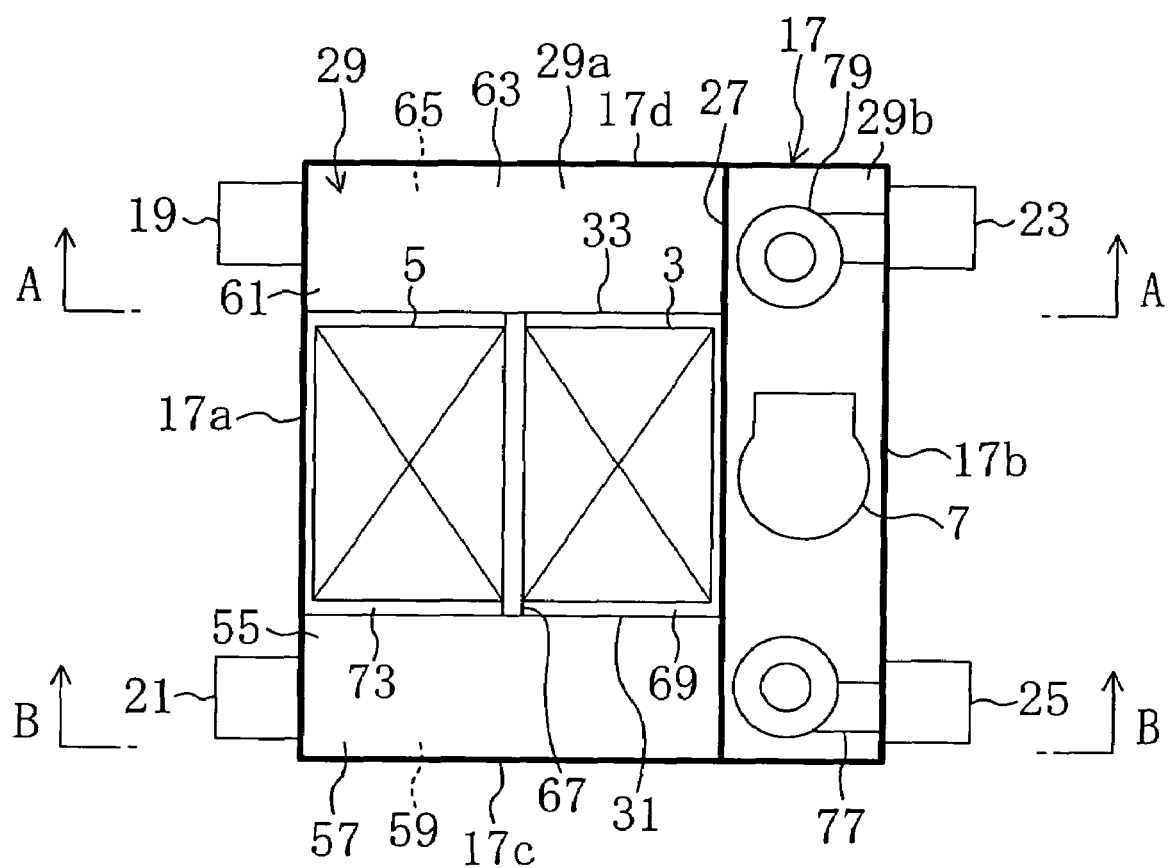
FIG. 3 is a plan view of a casing, with the omission of its top surface plate.
Figure 4:
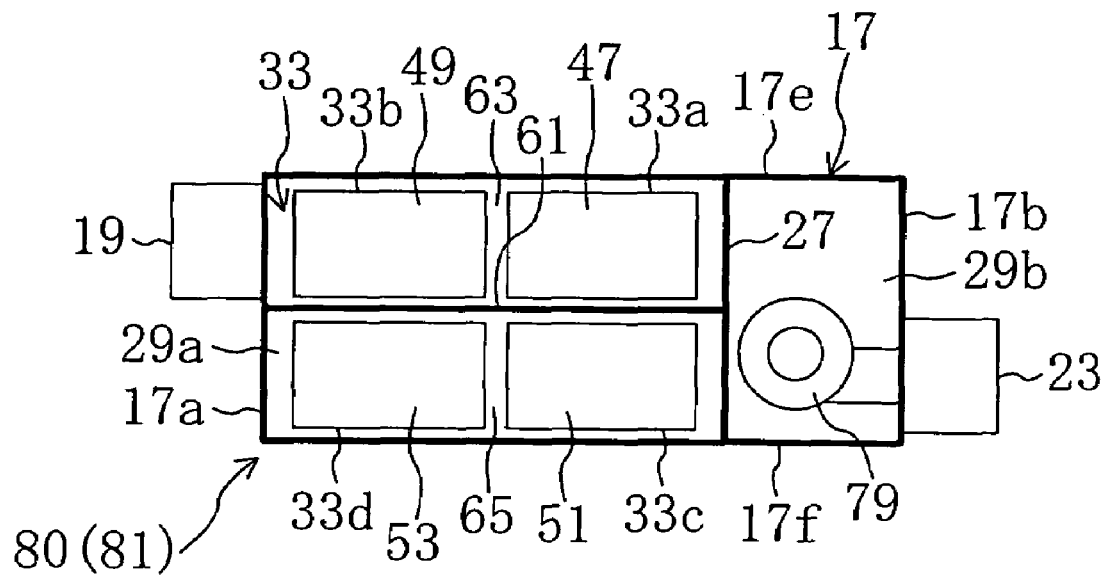
FIG. 4 is an end elevation view of the casing taken on line A-A of FIG. 3.
Figure 5:
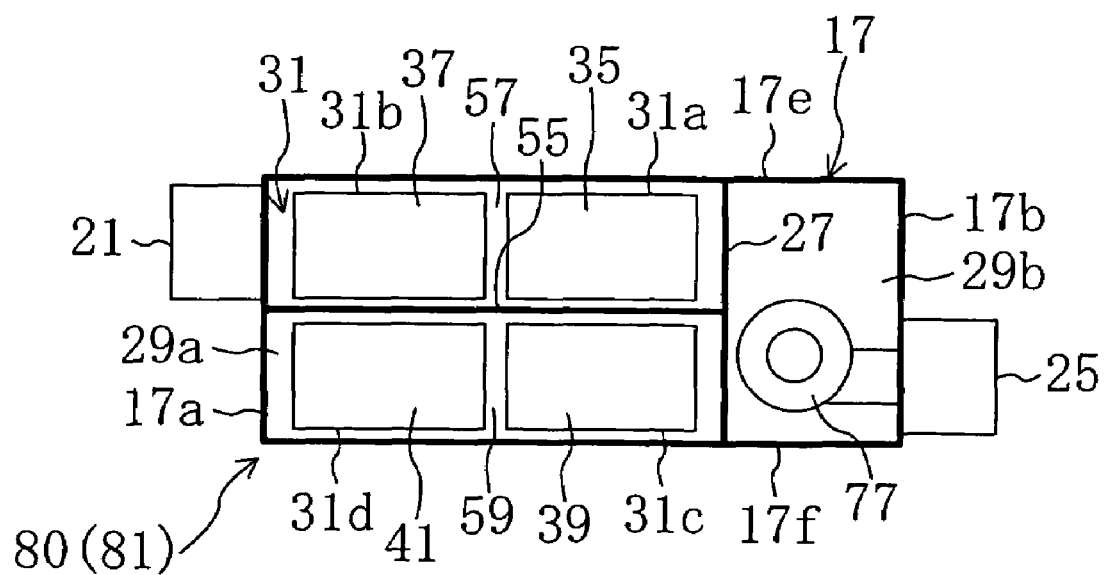
FIG. 5 is an end elevation view of the casing taken on line B-B of FIG. 3.

Next, with reference to FIGS. 3-5, the inner structure of the casing (17) is described. Referring to FIG. 3, the casing (17) has a front side (which is shown as a lower side in the figure), a backside (upper side), a left-hand side (left side), and a right-hand side (right side). In addition, in FIGS. 4 and 5, the casing (17) has a top surface (which is shown as an upper side in the figure) and a bottom surface (lower side).

The casing (17) is square when viewed in plan and is shaped like a flat box. The casing (17) has a left side plate (17a) which is provided with a first suction opening (19) through which outdoor air OA is drawn in and a second suction opening (21) through which room air RA (return air)

is drawn in. The casing (17) further has a right side plate (17b) which is provided with a first outlet opening (23) through which emission air EA is expelled outside the room and a second outlet opening (25) through which humidity-conditioned air SA is supplied to an indoor space.

Disposed inside the casing (17) is a partition plate (27) which is a partition member. The partition plate (27) defines an air chamber (29a) and an equipment chamber (29b) inside the casing (17). The partition plate (27) is disposed perpendicularly, i.e., in the direction of the thickness of the casing (17). Referring to FIGS. 4 and 5, the partition plate (27) is disposed so as to extend from a top plate (17e) of the casing (17) (upper side) to a bottom plate (17f) of the casing (17) (lower side). Furthermore, with reference to FIG. 3, the partition plate (27) is disposed so as to extend from a front plate (17c) of the casing (17) (lower side) to a back plate (17d) of the casing (17) (upper side). In addition, in FIG. 3, the partition plate (27) is positioned, such that it lies somewhat right relative to the central part of the casing (17).

The equipment chamber (29b) accommodates the compressor (7) and other devices in the refrigerant circuit (1) with the exclusion of the heat exchangers (3, 5). In addition, the equipment chamber (29b) houses a first fan (79) and a second fan (77). The first fan (79) is connected to the first outlet opening (23) while, on the other hand, the second fan (77) is connected to the second outlet opening (25).

The air chamber (29a) of the casing (17) is provided with a first-end surface plate (33) which is a partition member, a second end surface plate (31) which is a partition member, and a central dividing plate (67) which is a partition member. The first end surface plate (33), the second end surface plate (31), and the dividing plate (67) are all disposed perpendicularly, i.e., in the direction of the thickness of the casing (17) and, as shown in FIGS. 4 and 5, these plates are disposed, such that they extend from the top surface plate (17e) to the bottom surface plate (17e) in the casing (17).

As shown in FIG. 3, the first end surface plate (33) and the second end surface plate (31) are disposed so as to extend to the partition plate (27) from the left side surface plate (17a) in the casing (17). In addition, the first end surface plate (33) is positioned, such that it slightly overlies the central part of casing (17) in FIG. 3. On the other hand, the second end surface plate (31) is positioned, such that it slightly underlies the central part of casing (17), as shown in FIG. 3.

The dividing plate (67) is disposed so as to extend between the first end surface plate (33) and the second end surface plate (31), as shown in FIG. 3.

And, in the casing (17), a first heat exchange chamber (69) is divisionally formed as a compartment by the first end surface plate (33), the second end surface plate (31), the dividing plate (67), and the partition plate (27). In addition, in the casing (17), a second heat exchange chamber (73) is divisionally formed as a compartment by the first end surface plate (33), the second end surface plate (31), the dividing plate (67), and the left side surface plate (17a) of the casing (17). In other words, the first heat exchange chamber (69) lies on the right-hand side in FIG. 3; the second heat exchange chamber (73) lies on the left-hand side in FIG. 3; and the first heat exchange chamber (69) and the second heat exchange chamber (73) are formed adjacently parallelly with each other.

The first heat exchanger (3) is disposed in the first heat exchange chamber (69) The second heat exchanger (5) is disposed in the second heat exchange chamber (73).

A horizontal plate (61), serving as a partition member, is disposed between the first end surface plate (33) and the back plate (17d) of the casing (17), such that it defines a first inflow passage (63) and a first outflow passage (65). In addition, a horizontal plate (55), serving as a partition member, is disposed between the second end surface plate (31) and the front plate (17c) of the casing (17), such that it defines a second inflow passage (57) and a second outflow passage (59).

The interior space of the casing (17) is divided vertically (i.e., in the direction of the thickness of the casing (17)) into upper and lower spaces by the horizontal plates (61, 55). And, in FIG. 4, the first inflow passage (63) is formed on the top surface side while, on the other hand, the first outflow passage (65) is formed on the bottom surface side. In FIG. 5, the second inflow passage (57) is formed on the top surface side while, on the other hand, the second outflow passage (59) is formed on the bottom surface side.

That is, the first inflow passage (63) and the first outflow passage (65) are formed along one end surface in a thickness direction in which respective one surfaces of the first and second heat exchange chambers (69) and (73) continue, and are arranged in a superimposed manner in the thickness direction of the first and second heat exchange chambers (69, 73).

In addition, a second air inflow passage (57) and a second air outflow passage (59) which are formed along another end surface which is an end surface where respective one surfaces of the heat exchange chambers (69, 73) continue and which is situated face to face with the one end surface, and which are arranged in a superimposed manner in the thickness direction of the heat exchange chambers (69, 73).

And, in FIG. 3, the first inflow passage (63) and the first outflow passage (65) are arranged symmetrically with the second inflow passage (57) and the second outflow passage (59), in other words, they are arranged in plane symmetry on the basis of a central line that crosses the first and second heat exchange chambers (69) and (73).

In addition, the first inflow passage (63) is in communication with the first suction opening (19). The first outflow passage (65) is in communication with the first fan (79), thereby being in communication with the first outlet opening (23). The second inflow passage (57) is in communication with the second suction opening (21). The second outflow passage (59) is in communication with the second fan (77), thereby being in communication with the second outlet opening (25).

As shown in FIG. 4, the first end surface plate (33) is provided with first to fourth openings (33a, 33b, 33c, 33d). The first to fourth openings (33a, 33b, 33c, 33d) are provided with a first damper (47), a second damper (49), a third damper (51), and a fourth damper (53), respectively. These four openings (33a-33d) are positioned in close proximity to one another in a matrix direction, in other words they are vertically laterally arranged in the form of squares in pairs. The first opening (33a) and the third opening (33c) open to the first heat exchange chamber (69) while, on the other hand, the second opening (33b) and the fourth opening (33d) open to the second heat exchange chamber (73).

The first opening (33a) allows communication between the first inflow passage (63) and the first heat exchange chamber (69). The third opening (33c) allows communication between the first outflow passage (65) and the first heat exchange chamber (69). In addition, the second opening (33b) allows communication between the first inflow passage (63) and the second heat exchange chamber (73). The fourth opening (33d) allows communication between the first outflow passage (65) and the second heat exchange chamber (73).

As shown in FIG. 5, the second end surface plate (31) is provided with fifth to eighth openings (31a, 31b, 31c, 31d). The fifth to eighth openings (31a, 31b, 31c, 31d) are provided with a fifth damper (35), a sixth damper (37), a seventh damper (39), and an eighth damper (41), respectively. The four openings (31*a*, 31*b*, 31*c*, 31*d*) are positioned in close proximity to one another in a matrix direction, in other words they are vertically laterally arranged in the form of squares in pairs. The fifth opening (31*a*) and the seventh opening (31*c*) open to the first heat exchange chamber (69) while, on the other hand, the sixth opening (31*b*) and the eighth opening (31*d*) open to the second heat exchange chamber (73).

The fifth opening (31*a*) allows communication between the second inflow passage (57) and the first heat exchange chamber (69). The seventh opening (31*c*) allows communication between the second outflow passage (59) and the first heat exchange chamber (69). In addition, the sixth opening (31*b*) allows communication between the second inflow passage (57) and the second heat exchange chamber (73). The eighth opening (31*d*) allows communication between the second outflow passage (59) and the second heat exchange chamber (73).

Figure 6:
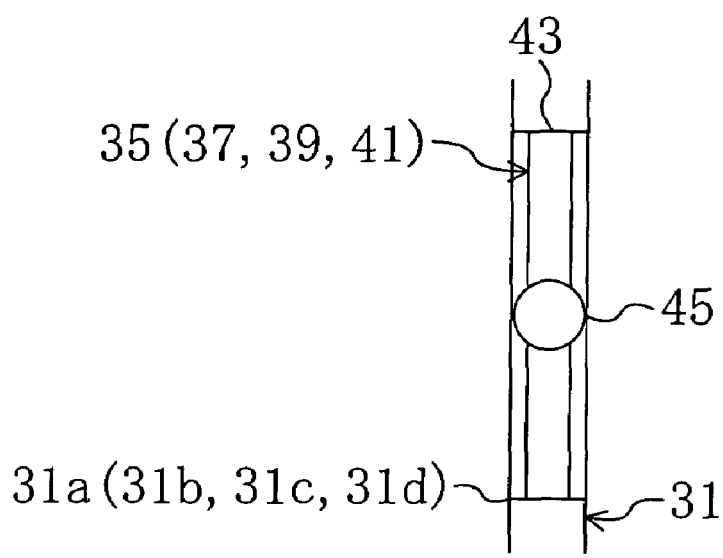
FIG. 6 is a side view of a damper when placed in the closed state.
Figure 7:
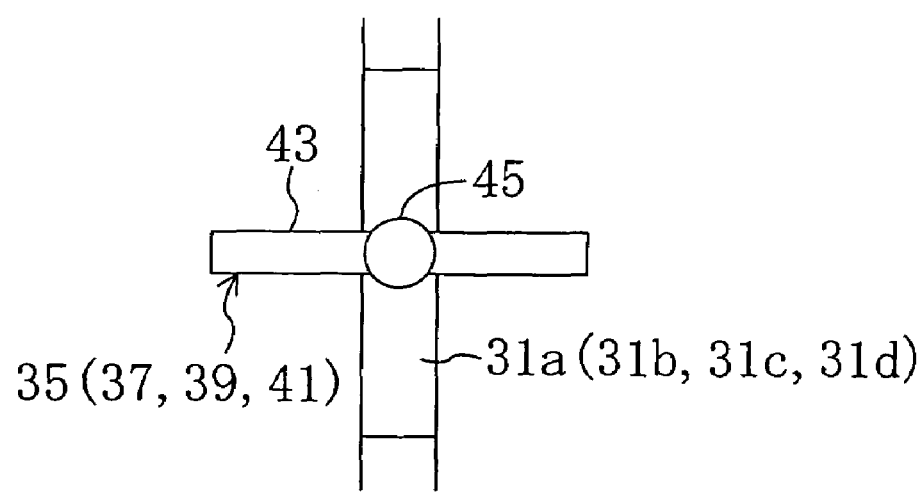
FIG. 7 is a side view of the damper when placed in the open state.

The first to eighth dampers (47-53, 35-41) constitute opening and closing means for opening and closing the openings (33*a*-33*d*, 31*a*-31*d*). The description is made with a focus on the fifth to eighth dampers (35-41). The damper (35-41) has a vane part (43) shaped like a rectangle and a shaft part (45) arranged centrally in the vane part (43), as shown in FIGS. 6 and 7. The shaft part (45) supports the vane part (43) on the first end surface plate (33) or on the second end surface plate (31), such that the vane part (43) is rotatable. And, as shown in FIG. 7, the damper (35-41) is configured so that the opening (31*a*-31*d*) is placed in the open state when the vane part (43) is placed in a horizontal position. The other first to fourth dampers (47-53) are formed so as to have the same structure as that of the fifth to eighth dampers (35-41).

The structure of the dampers (35-41) is not limited to the ones shown in FIGS. 6 and 7. That is, each damper (47-53, 35-41) may employ a structure shown in FIGS. 10 and 11 or a structure shown in FIGS. 8 and 9.

Figure 8:
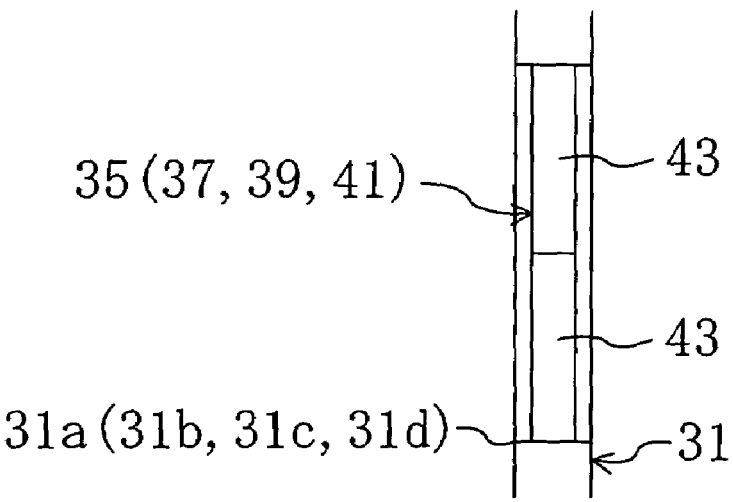
FIG. 8 is a side view of a first modification of the damper when-placed in the closed state.
Figure 9:
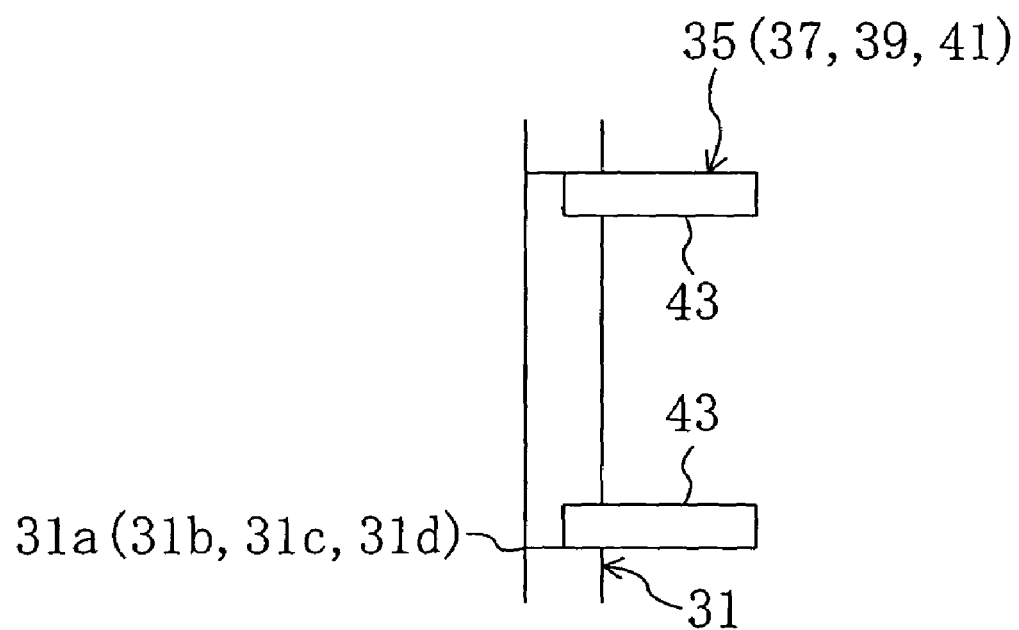
FIG. 9 is a side view of the first damper modification when placed in the open state.

Referring to FIGS. 8 and 9, there are shown fifth to eighth dampers (35-41) each of which is provided with two vane parts (43). Each damper (35-41) is configured, such that its two vane parts (43) rotate individually upwards and downwards respectively, thereby placing the associated opening (31*a*-31*d*) in the open state.

Figure 10:
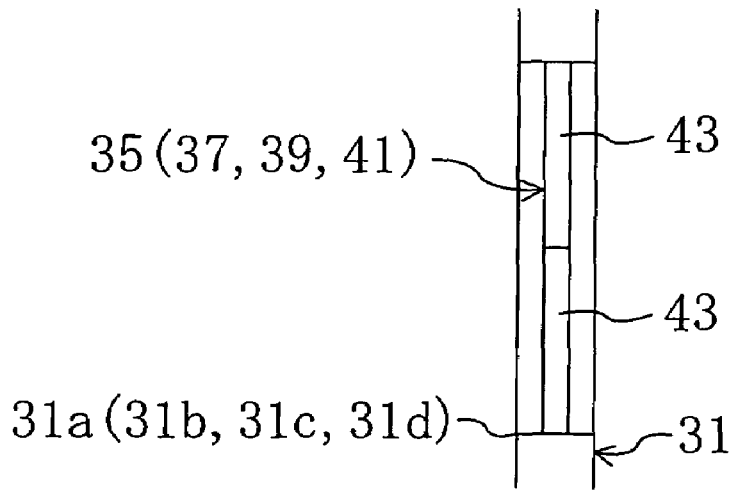
FIG. 10 is a side view of a second modification of the damper when placed in the closed state.
Figure 11:
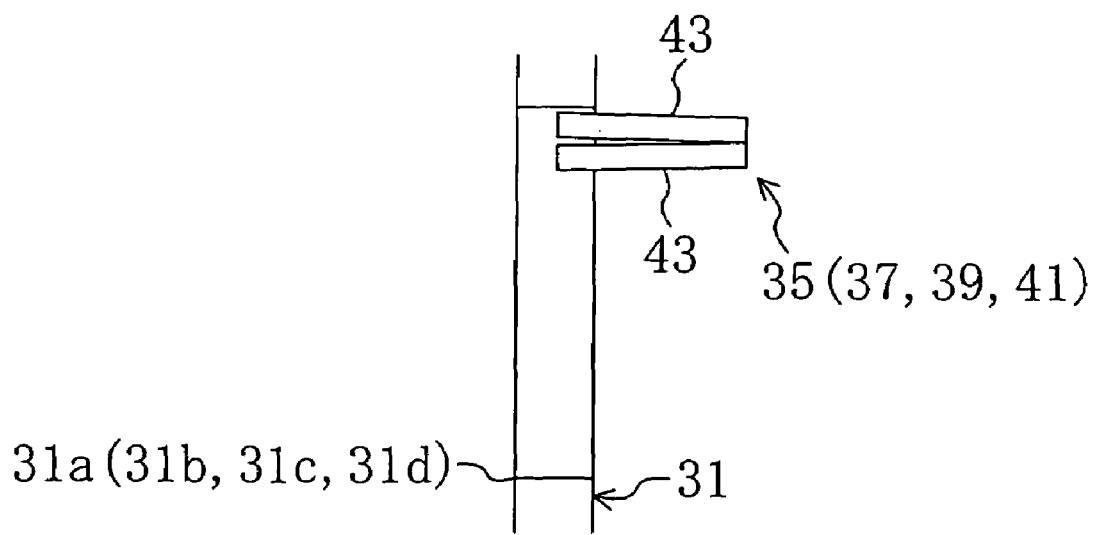
FIG. 11 is a side view of the second damper modification when placed in the open state.

Referring to FIGS. 10 and 11, there are shown fifth to eighth dampers (35-41) each of which is provided with two vane parts (43). Each damper (35-41) is configured, such that its two vane parts (43) is folded upwards, thereby placing the associated opening (31*a*-31*d*) in the open state.

In addition, the present humidity controller apparatus is provided with a dehumidifier means (80) and a humidifier means (81). And, it is configured that the dehumidifier means (80) may be switched to function as the humidifier means (81), and vice versa, thereby allowing a switch between a dehumidification mode of operation and a humidification mode of operation.

The dehumidifier means (80) switches the circulation of refrigerant in the refrigerant circuit (1) and the distribution of air by the damper (47-53, 35-41) so that moisture present in a stream of air flowing through the first heat exchanger (3) or the second heat exchanger (5), whichever functions as a refrigerant evaporating heat exchanger, is adsorbed by adsorbent material while, on the other hand, adsorbent material is regenerated by the release of moisture present in the adsorbent material to a stream of air flowing through the second heat exchanger (5) or the first heat exchanger (3), whichever functions as a refrigerant condensing heat exchanger, and the stream of air thus converted into a stream of dehumidified air by the adsorbent material is supplied into the room.

On the other hand, the humidifier means (81) switches the circulation of refrigerant in the refrigerant circuit (1) and the distribution of air by the damper (47-53, 35-41) so that moisture present in a stream of air flowing through the first heat exchanger (3) or the second heat exchanger (5), whichever functions as a refrigerant evaporating heat exchanger, is adsorbed by adsorbent material while, on the other hand, adsorbent material is regenerated by the release of moisture present in the adsorbent material to a stream of air flowing through the second heat exchanger (5) or the first heat exchanger (3), whichever functions as a refrigerant condensing heat exchanger, and the stream of air thus converted into a stream of humidified air by the adsorbent material is supplied into the room.

Running Operation

Next, the running operation of the above-described humidity controller apparatus is described. The humidity controller apparatus takes in a stream of first air and a stream of second air and performs selectively a dehumidification operation or a humidification operation. In addition, the humidity controller apparatus continuously performs dehumidification and humidification operations by alternately repeating a first operation and a second operation. Besides, the humidity controller apparatus performs dehumidification and humidification operations in full ventilation mode and, in addition, humidification and dehumidification operations in circulation mode.

Dehumidification Operation in Full Ventilation Mode

In a dehumidification operation during full ventilation mode by the dehumidifier means (80), outdoor air OA is brought in as the first air and is supplied to the room while, on the other hand, room air RA is brought in as the second air and is discharged outside the room.

First Operation

In the first operation in which the first fan (79) and the second fan (77) are driven, the process of moisture adsorption in the second heat exchanger (5) and the process of adsorbent-material regeneration (moisture desorption) in the first heat exchanger (3) are carried out. In other words, in the first operation, moisture present in the outdoor air OA is adsorbed in the second heat exchanger (5) and moisture desorbed out of the first heat exchanger (3) is given to the room air RA.

Figure 12:
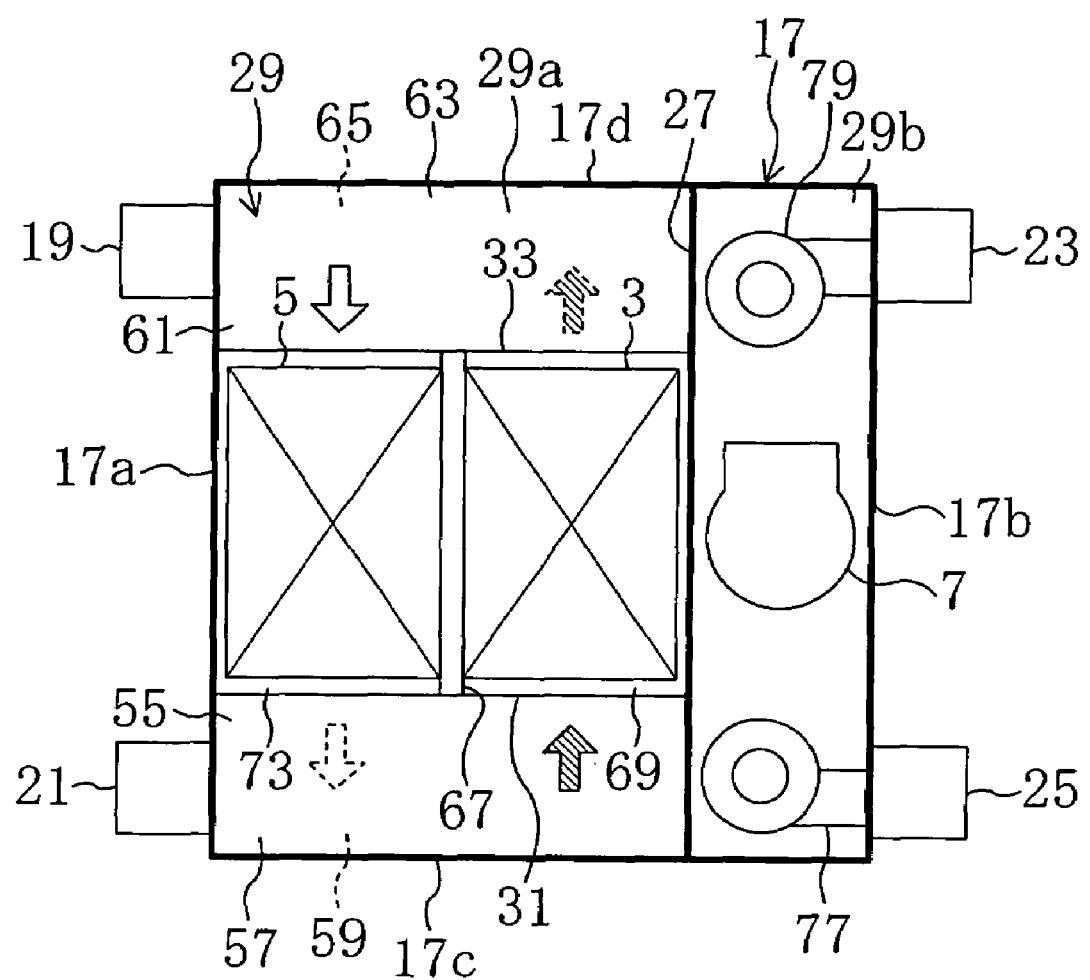
FIG. 12 is a plan view of the casing with the omission of its top surface plate, illustrating a first operation during dehumidification.

Referring to FIG. 1(A) and FIG. 12, during the first operation the second damper (49), the third damper (51), the eighth damper (41), and the fifth damper (35) are placed in the open state while, on the other hand, the first damper (47), the fourth damper (53), the sixth damper (37), and the seventh damper (39) are placed in the closed state. The first heat exchanger (3) is supplied with a stream of room air RA. The second heat exchanger (5) is supplied with a stream of outdoor air OA.

In addition, the four-way switching valve (9) changes state to a state shown in FIG. 1(A). As a result, in the refrigerant circuit (1) the first heat exchanger (3) functions as a condenser and the second heat exchanger (5) functions as an evaporator.

That is, high-temperature, high-pressure refrigerant expelled out of the compressor (7) flows into the first heat exchanger (3) as a heat carrier for heating. In the first heat exchanger (3), the adsorbent materials supported, respectively, on the external surface of each fin (13) and on the external surface of each heat transfer tube (15) are heated. This heating causes moisture desorption from the adsorbent materials, whereby the adsorbent materials are regenerated.

On the other hand, the refrigerant condensed in the first heat exchanger (3) is decompressed by the expansion valve (11). The post-decompression refrigerant flows into the second heat exchanger (5) as a heat carrier for cooling. In the second heat exchanger (5), heat of adsorption is generated when the adsorbent material supported on the external surface of each fin (13) and the adsorbent material supported on the external surface of each heat transfer tube (15) adsorb moisture. The refrigerant in the second heat exchanger (5) absorbs the heat of adsorption and then evaporates. The refrigerant evaporated is directed back to the compressor (7) and repeats such a circulation.

In addition, an inflow of room air RA entering through the second suction opening (21) by drive of the first and second fans (79) and (77) travels through the second inflow passage (57) and flows to the first heat exchange chamber (69) from the fifth opening (31a). In the first heat exchange chamber (69), moisture desorbed from the adsorbent material of the first heat exchanger (3) is released to the room air RA and, in this way, the room air RA is humidified. The room air RA thus humidified becomes a stream of emission air EA. The emission air EA exiting the first heat exchange chamber (69) flows through the first outflow passage (65) by way of the third opening (33c). Then, the emission air EA, after passing through the first fan (79), is discharged outdoors through the first outlet opening (23).

On the other hand, an inflow of outdoor air OA entering through the first suction opening (19) travels through the first inflow passage (63) and flows to the second heat exchange chamber (73) from the second opening (33b). In the second heat exchange chamber (73), moisture in the outdoor air OA is adsorbed by the adsorbent material of the second heat exchanger (5) and, in this way, the outdoor air OA is dehumidified. The outdoor air OA thus dehumidified becomes a stream of humidity conditioned air SA. The humidity conditioned air SA exiting the second heat exchange chamber (73) flows through the second outflow passage (59) by way of the eighth opening (31d). Then, the humidity conditioned air SA, after passing through the second fan (77), is supplied indoors through the second outlet opening (25).

Upon completion of the execution of the first operation, the second operation is carried out.

Second Operation

In the second operation in which the first fan (79) and the second fan (77) are driven, the process of adsorption in the first heat exchanger (3) and the process of regeneration in the second heat exchanger (5) are carried out. In other words, in the second operation, moisture present in outdoor air OA is adsorbed in the first heat exchanger (3) and moisture desorbed out of the second heat exchanger (5) is given to room air RA.

Figure 13:
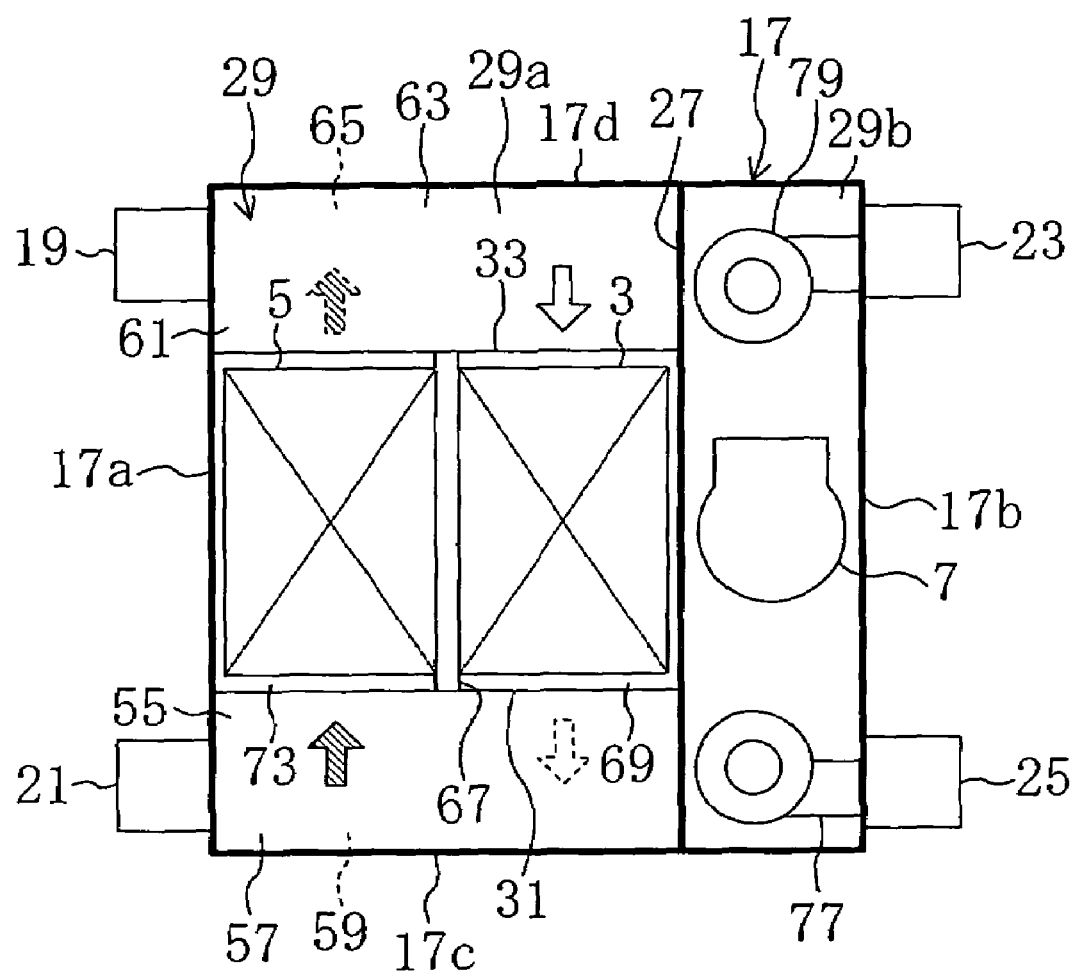
FIG. 13 is a plan view of the casing with the omission of its top surface plate, illustrating a second operation during dehumidification.

Referring to FIG. 1(B) and FIG. 13, during the second operation the first damper (47), the fourth damper (53), the seventh damper (39), and the sixth damper (37) are placed in the open state while, on the other hand, the third damper (51), the second damper (49), the fifth damper (35), and the eighth damper (41) are placed in the closed state. And, the first heat exchanger (3) is supplied with a stream of outdoor air OA. The second heat exchanger (5) is supplied with a stream of room air RA.

In addition, the four-way switching valve (9) changes state to a state shown in FIG. 1(B). As a result, in the refrigerant circuit (1) the second heat exchanger (5) functions as a condenser and the first heat exchanger (3) functions as an evaporator.

That is, high-temperature, high-pressure refrigerant expelled out of the compressor (7) flows into the second heat exchanger (5) as a heat carrier for heating. In the second heat exchanger (5), the adsorbent materials supported, respectively, on the external surface of each fin (13) and on the external surface of each heat transfer tube (15) are heated. This heating causes moisture desorption from the adsorbent materials, whereby the adsorbent materials are regenerated.

On the other hand, the refrigerant condensed in the second heat exchanger (5) is decompressed by the expansion valve (11). The post-decompression refrigerant flows into the first heat exchanger (3) as a heat carrier for cooling. In the first heat exchanger (3), heat of adsorption is generated when the adsorbent material supported on the external surface of each fin (13) and the adsorbent material supported on the external surface of each heat transfer tube (15) adsorb moisture. The refrigerant in the first heat exchanger (3) absorbs the heat of adsorption and then evaporates. The refrigerant evaporated is directed back to the compressor (7) and repeats such a circulation.

In addition, an inflow of room air RA entering through the second suction opening (21) by drive of the first and second fans (79) and (77) travels through the second inflow passage (57) and flows to the second heat exchange chamber (73) from the sixth opening (31b). In the second heat exchange chamber (73), moisture desorbed from the adsorbent material of the second heat exchanger (5) is released to the room air RA and, in this way, the room air RA is humidified. The room air RA thus humidified becomes a stream of emission air EA. The emission air EA exiting the second heat exchange chamber (73) flows through the first outflow passage (65) by way of the fourth opening (33d). Then, the emission air EA, after passing through the first fan (79), is discharged outdoors from the first outlet opening (23).

On the other hand, an inflow of outdoor air OA entering through the first suction opening (19) travels through the first inflow passage (63). The outdoor air OA flows into the first heat exchange chamber (69) from the first opening (33a). In the first heat exchange chamber (69), moisture in the outdoor air OA is adsorbed by the adsorbent material of the first heat exchanger (3), whereby the outdoor air OA is dehumidified. The outdoor air OA thus dehumidified becomes a stream of humidity conditioned air SA. The humidity conditioned air SA exiting the first heat exchange chamber (69) flows through the second outflow passage (59) by way of the seventh opening (31c). Then, the humidity conditioned air SA, after passing through the second fan (77), is supplied indoors through the second outlet opening (25).

After execution of the second operation, the first operation is carried out again. And, indoor space dehumidification is continuously carried out by repetition of the first operation and the second operation.

Humidification Operation in Full Ventilation Mode

In a humidification operation in full ventilation mode by the humidifier means (81), room air RA is brought in as the first air and is discharged outside the room while, on the other hand, outdoor air OA is brought in as the second air and is supplied into the room.

First Operation

In the first operation in which the first fan (79) and the second fan (77) are driven, the process of adsorption in the second heat exchanger (5) and the process of regeneration in the first heat exchanger (3) are carried out. In other words, in the first operation, moisture present in the room air RA is adsorbed in the second heat exchanger (5) and moisture desorbed out of the first heat exchanger (3) is given to the outdoor air OA.

Figure 14:
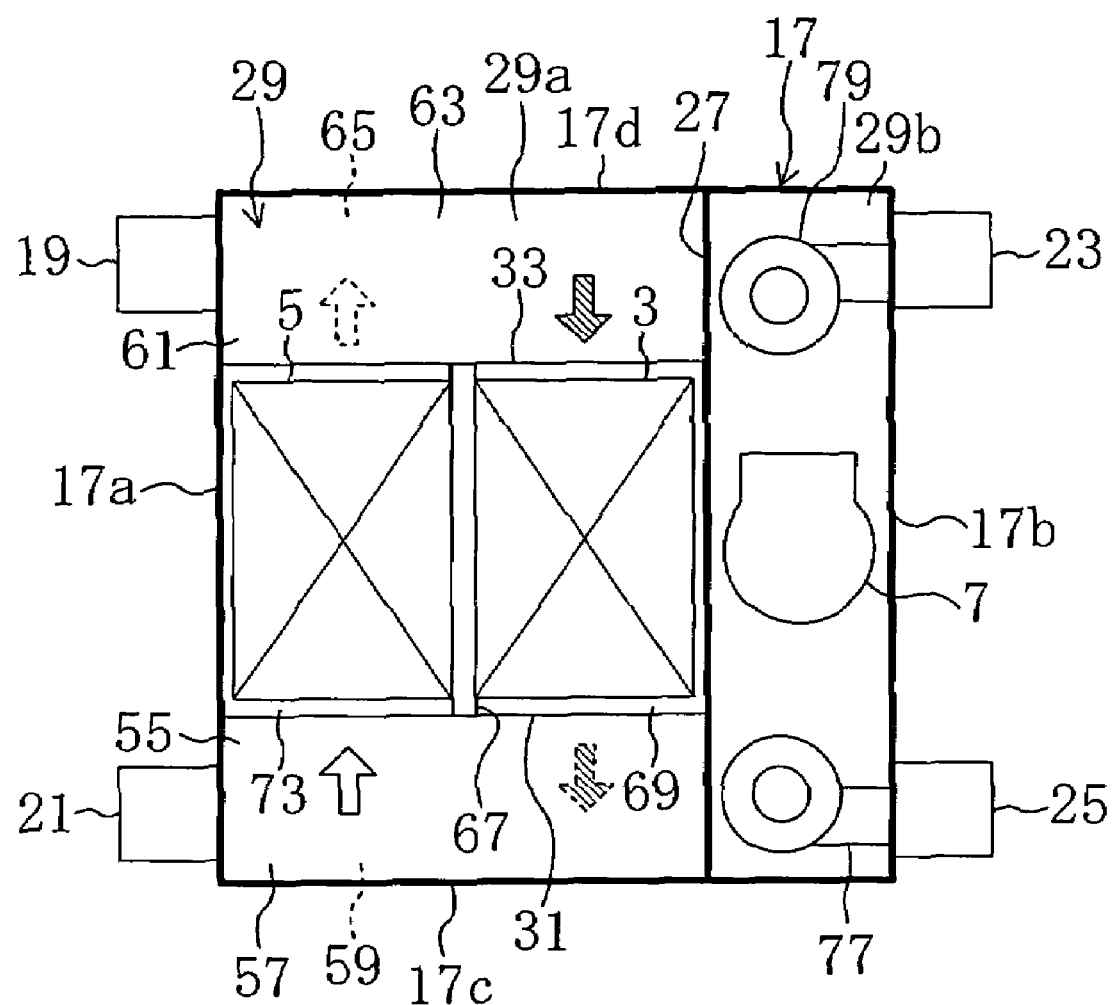
FIG. 14 is a plan view of the casing with the omission of its top surface plate, illustrating a first operation during humidification.

Referring to FIG. 1(A) and FIG. 14, during the first operation the first damper (47), the fourth damper (53), the seventh damper (39), and the sixth damper (37) are placed in the open state while, on the other hand, the third damper (51), the second damper (49), the fifth damper (35), and the eighth damper (41) are placed in the closed state. The first heat exchanger (3) is supplied with a stream of outdoor air OA. The second heat exchanger (5) is supplied with a stream of room air RA.

In addition, the four-way switching valve (9) changes state to a state shown in FIG. 1(A). As a result, in the refrigerant circuit (1) the first heat exchanger (3) functions as a condenser and the second heat exchanger (5) functions as an evaporator.

That is, high-temperature, high-pressure refrigerant expelled out of the compressor (7) flows into the first heat exchanger (3) as a heat carrier for heating. In the first heat exchanger (3), the adsorbent materials supported, respectively, on the external surface of each fin (13) and on the external surface of each heat transfer tube (15) are heated. This heating causes moisture desorption from the adsorbent materials, whereby the adsorbent materials are regenerated.

On the other hand, the refrigerant condensed in the first heat exchanger (3) is decompressed by the expansion valve (11). The post-decompression refrigerant flows into the second heat exchanger (5) as a heat carrier for cooling. In the second heat exchanger (5), heat of adsorption is generated when the adsorbent material supported on the external surface of each fin (13) and the adsorbent material supported on the external surface of each heat transfer tube (15) adsorb moisture. The refrigerant in the second heat exchanger (5) absorbs the heat of adsorption and then evaporates. The refrigerant evaporated is directed back to the compressor (7) and repeats such a circulation.

In addition, an inflow of room air RA entering through the second suction opening (21) by drive of the first and second fans (79) and (77) travels through the second inflow passage (57) and flows into the second heat exchange chamber (73) from the sixth opening (31b). In the second heat exchange chamber (73), moisture in the room air RA is adsorbed by the adsorbent material of the second heat exchanger (5), whereby the room air RA is dehumidified. The room air RA thus dehumidified becomes a stream of emission air EA. The emission air EA exiting the second heat exchange chamber (73) flows through the first outflow passage (65) by way of the fourth opening (33d). Then, the emission air EA, after passing through the first fan (79), is discharged outdoors through the first outlet opening (23).

On the other hand, an inflow of outdoor air OA entering through the first suction opening (19) travels through the first inflow passage (63) and flows to the first heat exchange chamber (69) from the first opening (33a). In the first heat exchange chamber (69), moisture desorbed out of the adsorbent material of the first heat exchanger (3) is released to the outdoor air OA, whereby the outdoor air OA is humidified. The outdoor air OA thus humidified becomes a stream of humidity conditioned air SA. The humidity conditioned air SA exiting the first heat exchange chamber (69) flows through the second outflow passage (59) by way of the seventh opening (31c). Then, the humidity conditioned air SA, after passing through the second fan (77), is supplied indoors through the second outlet opening (25).

Upon completion of the execution of the first operation, the second operation carried out.

Second Operation

In the second operation in which the first fan (79) and the second fan (77) are driven, the process of adsorption in the first heat exchanger (3) and the process of regeneration in the second heat exchanger (5) are carried out. In other words, in the second operation, moisture present in room air RA is adsorbed in the first heat exchanger (3) and moisture desorbed out of the second heat exchanger (5) is given to outdoor air OA.

Figure 15:
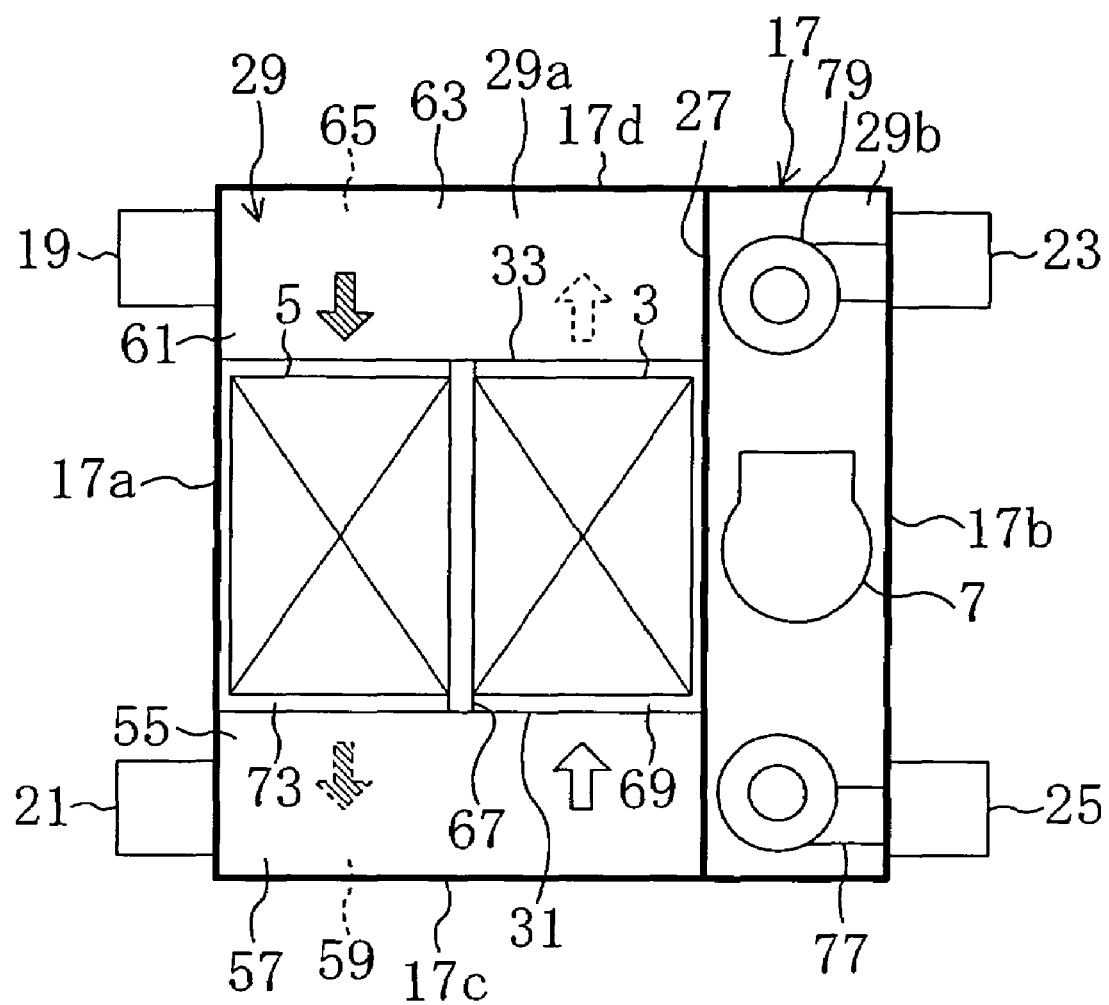
FIG. 15 is a plan view of the casing with the omission of its top surface plate, illustrating a second operation during humidification.

Referring to FIG. 1(B) and FIG. 15, during the second operation the second damper (49), the third damper (51), the eighth damper (41), and the fifth damper (35) are placed in the open state while, on the other hand, the fourth damper (53), the first damper (47), the sixth damper (37), and the seventh damper (39) are placed in the closed state. The first heat exchanger (3) is supplied with a stream of room air RA. The second heat exchanger (5) is supplied with a stream of outdoor air OA.

In addition, the four-way switching valve (9) changes state to a state shown in FIG. 1(B). As a result, in the refrigerant circuit (1) the second heat exchanger (5) functions as a condenser and the first heat exchanger (3) functions as an evaporator.

That is, high-temperature, high-pressure refrigerant expelled out of the compressor (7) flows to the second heat exchanger (5) as a heat carrier for heating. In the second heat exchanger (5), the adsorbent materials supported, respectively, on the external surface of each fin (13) and on the external surface of each heat transfer tube (15) are heated. This heating causes moisture desorption from the adsorbent materials, whereby the adsorbent materials are regenerated.

On the other hand, the refrigerant condensed in the second heat exchanger (5) is decompressed by the expansion valve (11). The post-decompression refrigerant flows to the first heat exchanger (3) as a heat carrier for cooling. In the first heat exchanger (3), heat of adsorption is generated when the adsorbent materials supported, respectively, on the external surface of each fin (13) and on the external surface of the heat transfer tube (15) adsorb moisture. The refrigerant in the first heat exchanger (3) absorbs the heat of adsorption and then evaporates. The refrigerant evaporated is directed back to the compressor (7) and repeats such a circulation.

In addition, an inflow of air RA entering through the second suction opening (21) by drive of the first and second fans (79) and (77) travels through the second inflow passage (57). Then, the room air RA flows to the first heat exchange chamber (69) from the fifth opening (31a). In the first heat exchange chamber (69), moisture in the room air RA is adsorbed by the adsorbent material of the first heat exchanger (3), whereby the room air RA is dehumidified. The room air RA thus dehumidified becomes a stream of emission air EA. The emission air EA exiting the first heat exchange chamber (69) flows through the first outflow passage (65) by way of the third opening (33c). Then, after passage through the first fan (79), the emission air EA is discharged outdoors through the first outlet opening (23).

On the other hand, an inflow of outdoor air OA entering through the first suction opening (19) travels through the first inflow passage (63). Then, the outdoor air OA flows into the second heat exchange chamber (73) from the second opening (33b). In the second heat exchange chamber (73), moisture desorbed from the adsorbent material of the second heat exchanger (5) is released to the outdoor air OA, whereby the outdoor air OA is humidified. The outdoor air OA thus humidified becomes a stream of humidity conditioned air SA. The humidity conditioned air SA exiting the second heat exchange chamber (73) flows through the second outflow passage (59) by way of the eighth opening (31d). Then, after passage through the second fan (77), the humidity conditioned air SA is supplied indoors through second outlet opening (25).

Upon completion of the execution of the second operation, the first operation is carried out again. And, indoor space humidification is continuously carried out by repetition of the first operation and the second operation.

Dehumidification Operation in Circulation Mode

During a dehumidification operation in circulation mode by the dehumidifier means (80), room air RA is brought in as the first air and is supplied indoors while, on the other hand, outdoor air OA is brought in as the second air and is discharged outdoors. The circulation of refrigerant in the refrigerant circuit (1) is the same as that in full ventilation mode and the description thereof is omitted accordingly.

First Operation

In the first operation, the process of adsorption in the second heat exchanger (5) and the process of regeneration (desorption) in the first heat exchanger (3) are carried out. In other words, in the first operation, moisture present in room air RA is adsorbed in the second heat exchanger (5) and moisture desorbed out of the first heat exchanger (3) is given to outdoor air OA.

During the first operation, the first damper (47), the third damper (51), the sixth damper (37), and the eighth damper (41) are placed in the open state while, on the other hand, the second damper (49), the fourth damper (53), the fifth damper (35), and the seventh damper (39) are placed in the closed state. The first heat exchanger (3) is provided with a stream of outdoor air OA. The second heat exchanger (5) is provided with a stream of room air RA.

An inflow of outdoor air OA entering through the first suction opening (19) travels through the first inflow passage (63). Then, the outdoor air OA flows into the first heat exchange chamber (69) from the first opening (33a). In the first heat exchange chamber (69), moisture desorbed from the adsorbent material of the first heat exchanger (3) is released to the outdoor air OA, whereby the outdoor air OA is humidified. The outdoor air OA thus humidified becomes a stream of emission air EA. The emission air EA exiting the first heat exchange chamber (69) flows through the first outflow passage (65) by way of the third opening (33c). Then, after passage through the first fan (79), the emission air EA is discharged outdoors through the first outlet opening (23).

On the other hand, an inflow of room air RA entering through the second suction opening (21) travels through the second inflow passage (57). Then, the room air RA flows into the second heat exchange chamber (73) from the sixth opening (31b). In the second heat exchange chamber (73), moisture in the room air RA is adsorbed by the adsorbent material of the second heat exchanger (5), whereby the room air RA is dehumidified. The room air RA thus dehumidified becomes a stream of humidity conditioned air SA. The humidity conditioned air SA exiting the second heat exchange chamber (73) flows through the second outflow passage (59) by way of the eighth opening (31d). Then, after passage through the second fan (77), the humidity conditioned air SA is supplied indoors through the second outlet opening (25).

Upon completion of the execution of the first operation, the second operation is carried out.

Second Operation

In the second operation, the process of adsorption in the first heat exchanger (3) and the process of regeneration in the second heat exchanger (5) are carried out. In other words, in the second operation, moisture present in room air RA is adsorbed in the first heat exchanger (3) and moisture desorbed out of the second heat exchanger (5) is given to outdoor air OA.

During the second operation, the second damper (49), the fourth damper (53), the fifth damper (35), and the seventh damper (39) are placed in the open state while, on the other hand, the first damper (47), the third damper (51), the sixth damper (37), and the eighth damper (41) are placed in the closed state. The first heat exchanger (3) is provided with a stream of room air RA. The second heat exchanger (5) is provided with a stream of outdoor air OA.

An inflow of outdoor air OA entering through the first suction opening (19) travels through the first inflow passage (63). Then, the outdoor air OA flows into the second heat exchange chamber (73) from the second opening (33b). In the second heat exchange chamber (73), moisture desorbed from the adsorbent material of the second heat exchanger (5) is released to the outdoor air OA, whereby the outdoor air OA is humidified. The outdoor air OA thus humidified becomes a stream of emission air EA. The emission air EA exiting the second heat exchange chamber (73) flows through the first outflow passage (65) by way of the fourth opening (33d). Then, after passage through the first fan (79), the emission air EA is discharged outdoors through the first outlet opening (23).

On the other hand, an inflow of room air RA entering through the second suction opening (21) travels through the second inflow passage (57). Then, the room air RA flows into the first heat exchange chamber (69) from the fifth opening (31a). In the first heat exchange chamber (69), moisture in the room air RA is adsorbed by the adsorbent material of the first heat exchanger (3), whereby the room air RA is dehumidified. The room air RA thus dehumidified becomes a stream of humidity conditioned air SA. The humidity conditioned air SA exiting the first heat exchange chamber (69) flows through the second outflow passage (59) by way of the seventh opening (31c). Then, after passage through the second fan (77), the humidity conditioned air SA is supplied indoors through the second outlet opening (25).

After execution of the second operation, the first operation is carried out again. And, indoor space dehumidification is continuously carried out by repetition of the first operation and the second operation.

Humidification Operation in Circulation Mode

In a humidification operation in circulation mode by the humidifier means (81), outdoor air OA is brought in as the first air and is discharged outdoors while, on the other hand, room air RA is brought in as the second air and is supplied indoors. The circulation of refrigerant in the refrigerant circuit (1) is the same as that in full ventilation mode and the description thereof is omitted accordingly.

First Operation

In the first operation, the process of adsorption in the second heat exchanger (5) and the process of regeneration in the first heat exchanger (3) are carried out. In other words, in the first operation, moisture present in outdoor air OA is adsorbed in the second heat exchanger (5) and moisture desorbed out of the first heat exchanger (3) is given to room air RA.

During the first operation, the second damper (49), the fourth damper (53), the fifth damper (35), and the seventh damper (39) are placed in the open state while, on the other hand, the first damper (47), the third damper (51), the sixth damper (37), and the eighth damper (41) are placed in the closed state. The first heat exchanger (3) is supplied with a stream of room air RA. The second heat exchanger (5) is supplied with a stream of outdoor air OA.

An inflow of room air RA entering through the second suction opening (21) travels through the second inflow passage (57). Then, the room air RA flows into the first heat exchange chamber (69) from the fifth opening (31a). In the first heat exchange chamber (69), moisture desorbed from the adsorbent material of the first heat exchanger (3) is released to the room air RA, whereby the room air RA is humidified. The room air RA thus humidified exits the first heat exchange chamber (69) and flows through the second outflow passage (59) by way of the seventh opening (31c). Then, after passage through the second fan (77), the room air RA is supplied indoors through the second outlet opening (25).

On the other hand, an inflow of outdoor air OA entering through the first suction opening (19) travels through the first inflow passage (63). Then, the outdoor air OA flows into the second heat exchange chamber (73) from the second opening (33b). In the second heat exchange chamber (73), moisture in the outdoor air OA is adsorbed by the adsorbent material of the second heat exchanger (5), whereby the outdoor air OA is dehumidified. The outdoor air OA thus dehumidified becomes a stream of emission air EA. The emission air EA exiting the second heat exchange chamber (73) flows through the first outflow passage (65) by way of the fourth opening (33d). Then, after passage through the first fan (79), the emission air EA is discharged outdoors through the first outlet opening (23).

Upon completion of the execution of the first operation, the second operation is carried out.

Second Operation

In the second operation, the process of adsorption in the first heat exchanger (3) and the process of regeneration in the second heat exchanger (5) are carried out. In other words, in the second operation, moisture present in outdoor air OA is adsorbed in the first heat exchanger (3) and moisture desorbed out of the second heat exchanger (5) is given to room air RA.

During the second operation, the first damper (47), the third damper (51), the sixth damper (37), and the eighth damper (41) are placed in the open state while, on the other hand, the second damper (49), the fourth damper (53), the fifth damper (35), and the seventh damper (39) are placed in the closed state. The second heat exchanger (5) is supplied with a stream of room air RA. The first heat exchanger (3) is provided with a stream of outdoor air OA.

An inflow of room air RA entering through the second suction opening (21) travels through the second inflow passage (57). Then, the room air RA flows into the second heat exchange chamber (73) from the sixth opening (31b). In the second heat exchange chamber (73), moisture desorbed from the adsorbent material of the second heat exchanger (5) is released to the room air RA, whereby the room air RA is humidified. The room air RA thus humidified becomes a stream of humidity conditioned air SA. The humidity conditioned air SA exiting the second heat exchange chamber (73) flows through the second outflow passage (59) by way of the eighth opening (31d). Then, after passage through the second fan (77), the humidity conditioned air SA is supplied indoors through the second outlet opening (25).

On the other hand, an inflow of outdoor air OA entering through the first suction opening (19) travels through the first inflow passage (63). Then, the outdoor air OA flows into the first heat exchange chamber (69) from the first opening (33a); In the first heat exchange chamber (69), moisture present in the outdoor air OA is adsorbed by the adsorbent material of the second heat exchanger (5), whereby the outdoor air OA is dehumidified. The outdoor air OA thus dehumidified becomes a stream of emission air EA. The emission air EA exiting the first heat exchange chamber (69) flows through the first outflow passage (65) by way of the third opening (33c). Then, after passage through the first fan (79), the emission air EA is discharged outdoors through the first outlet opening (23).

Upon completion of the execution of the second operation, the first operation is carried out again. And, indoor space humidification is continuously carried out by repetition of the first operation and the second operation.

Performance Comparison

Figure 16:
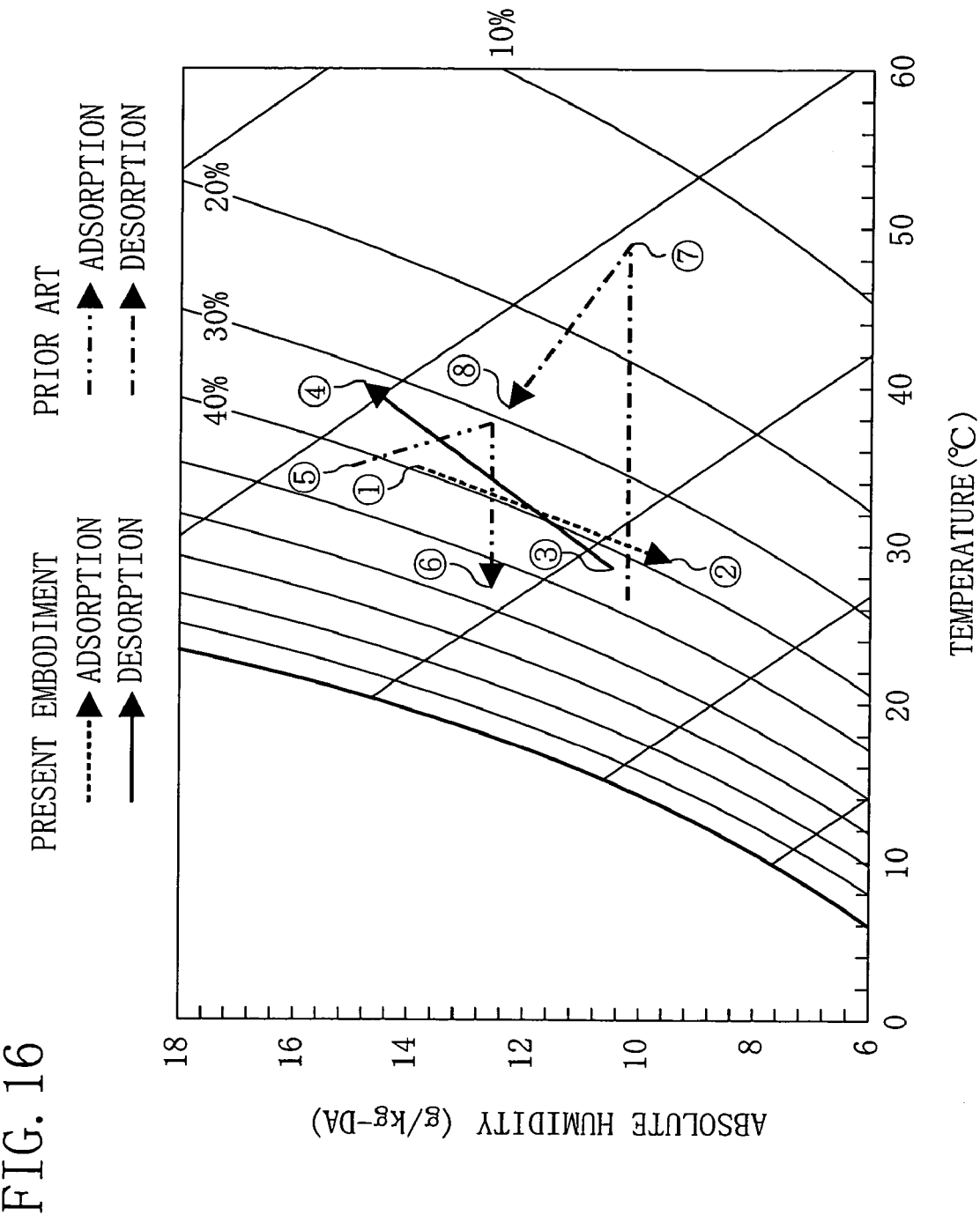
FIG. 16 is a psychrometric chart representing an air state of the humidity controller apparatus of the present embodiment and that of a conventional humidity controller apparatus during dehumidification operation.

Referring to FIG. 16, there is shown a psychrometric chart for comparison between the dehumidification operation of a humidity controller apparatus of the present embodiment and the dehumidification operation of a conventional humidity controller apparatus. Both the humidity controller apparatus of the present embodiment and the conventional humidity controller apparatus are capable of dehumidifying a volume of air (about 150 m$^3$) per hour.

Referring to FIG. 17, there is shown a table for comparison between the data of the dehumidification operation of a humidity controller apparatus of the present embodiment and the data of the dehumidification operation of a conventional humidity controller apparatus. The data shown in the table include information about the inlet temperature of outdoor air OA and other pieces of information. In addition, the symbols "①"-"⑧" indicated in FIG. 17 correspond to the symbols "①"-"⑧" indicated in FIG. 16, respectively.

As is clear from FIGS. 16 and 17, the amount of dehumidification of the humidity controller apparatus according to the present embodiment is greater than the amount of dehumidification of the conventional humidity controller apparatus. More specifically, the amount of dehumidification of the humidity controller apparatus according to the present embodiment is twice the amount of dehumidification of the conventional humidity controller apparatus.

Effects of Embodiment 1

As described above, according to the present embodiment, it is arranged that adsorbent materials are supported on the external surface of each heat transfer tube (15) as well as on the external surface of each fin (13) in the first and second heat exchangers (3) and (5), thereby allowing integral formation of a heating/cooling means and an adsorption/desorption means. Such an arrangement makes it possible to continuously provide dehumidification and humidification with the omission of an adsorbent-material container. This results in a reduction in the number of component parts, thereby making it possible to provide not only a simplified structure but also a downsized humidity controller apparatus.

Furthermore, it is arranged that adsorbent materials are supported on the external surface of each heat transfer tube (15) as well as on the external surface of each fin (13) in the first and second heat exchangers (3) and (5). Such an arrangement makes it possible to allow the refrigerant to directly cool or heat the adsorbent materials. As the result of this, the adsorption/desorption performance of the adsorbent materials is brought to a maximum. This makes it possible to improve the efficiency of adsorption/desorption and to provide a downsized humidity controller apparatus.

That is, the contact thermal resistance is large if the adsorbent material is brought into contact with only the external surface of each fin (13). Thus, the effects of cooling and heating cannot be expected. In the present embodiment, adsorbent materials are supported on the external surface of each heat transfer tube (15) and the external surface of each fin (13) in the first and second heat exchangers (3) and (5), whereby the effects of cooling and heating are sufficiently achieved.

Furthermore, it is arranged that adsorbent materials are supported on the external surface of the first heat exchanger (3) as well as on the external surface of second heat exchanger (5). Such arrangement makes it possible to continuously perform dehumidification and humidification. As the result of this, it becomes possible to perform dehumidification and humidification with high efficiency.

In addition, it is arranged that: the first heat exchange chamber (69) and the second heat exchange chamber (73) are adjacently arranged; the inflow passages (57, 63) and the outflow passages (59, 65) are arranged in a superimposed manner in the thickness direction of the first and second heat exchange chambers (69, 73). Such an arrangement provides a downsized humidity controller apparatus.

Besides, the eight dampers (35, . . . , 47, . . . ) are provided, whereby the direction in which air is distributed is switched. This makes it possible to achieve a switch in the distribution direction of air by a simplified structure.

Furthermore, the first inflow and outflow passages (63, 65) are arranged symmetrically with the second inflow and outflow passages (57, 59). As a result of such arrangement, the distribution resistance is reduced. This makes it possible to perform dehumidification and other like operation with high efficiency.

In addition, the openings (31*a*-31*d*, 33*a*-33*d*) are positioned in close proximity to one another in a matrix direction and are opened/closed by the dampers (35, . . . , 47, . . . ), respectively. Accordingly, air distribution systems are made simple in construction and the reduction of size is achieved.

Furthermore, the vapor compression refrigeration cycle refrigerant circuit (1) is employed, the adsorption and regeneration of adsorbent materials are carried out with high efficiency.

Other Embodiments of Invention

In the foregoing embodiment, in each of the first heat exchanger (3) and the second heat exchanger (5), adsorbent materials are supported on the external surface of each fin (13) as well as on the external surface of each heat transfer tube (15). In the present invention, however, it may be arranged that adsorbent materials are supported on at least either one of the external surface of the fin (13) and the external surface of the heat transfer tube (15).

In addition, in the foregoing embodiment, adsorbent materials are supported on both the first heat exchanger (3) and the second heat exchanger (5); however, it may be arranged that adsorbent material is supported on one of the heat exchangers, i.e., only on the first heat exchanger (3). In this case, moisture adsorption and moisture desorption (adsorbent material regeneration) take place at intervals.

Although in the foregoing embodiment the vapor compression refrigeration cycle refrigerant circuit (1) is employed to cool or heat the adsorbent materials of the first heat exchanger (3) and the second heat exchanger (5), cold water and hot water may be used instead. Specifically, the adsorbent materials may be cooled or heated by introducing a passage of cold or hot water in the first heat exchanger (3) and the second heat exchanger (5).

Furthermore, the present invention is not limited to the arrangement of the embodiment shown in plan view (see FIG. 3). That is, the orientation of arrangement is not limited to that of the embodiment.

In addition, in the above-described embodiment, the first fan (79) is connected to the first outlet opening (23). Alternatively, the first fan (79) may be provided so as to communicate with the first suction opening (19). In addition, the second fan (77) is connected to the second outlet opening (25). Alternatively, the second fan (77) may be provided so as to communicate with the second suction opening (21). In other words, the first fan (79) and the second fan (77) may be of the draw-through type or the forced draft type.

INDUSTRIAL APPLICABILITY

As has been described above, the humidity controller apparatuses of the present invention are useful in dehumidifying or humidifying an indoor space or the like and are particularly suited for a structure where an adsorbent material is supported on the surface of a heat exchanger.

The invention claimed is:

1. A humidity controller apparatus, comprising:
   a first heat exchange chamber (69) for accommodating a first heat exchanger (3), an adsorbent material being supported on a surface of said first heat exchanger (3);
   a second heat exchange chamber (73), formed adjacently to said first heat exchange chamber (69), for accommodating a second heat exchanger (5), an adsorbent material being supported on a surface of said second heat exchanger (5);
   a first air inflow passage (63) and a first air outflow passage (65) which are formed along one end surface in a thickness direction in which respective one surfaces of said two heat exchange chambers (69, 73) continue and which are arranged in a superimposed manner in the thickness direction of both said heat exchange chambers (69, 73);
   a second air inflow passage (57) and a second air outflow passage (59) which are formed along another end surface which is an end surface where respective one surfaces of said two heat exchange chambers (69, 73) continue and which is situated face to face with said one end surface, and which are arranged in a superimposed manner in the thickness direction of both said heat exchange chambers (69, 73); and
   opening/closing means (35, . . . , 47, . . . ) for opening and closing openings (31*a*, . . . , 33*a*, . . . ) for communication between said first heat exchange chamber (69) and said second heat exchange chamber (73), and each said inflow passage (57, 63) and each said outflow passage (59, 65).

2. The humidity controller apparatus of claim 1, wherein:
   four openings (33*a*-33*d*) which allow communication between said first heat exchange chamber (69) and said second heat exchange chamber (73) and said first air inflow passage (63) and said first air outflow passage (65) are positioned in close proximity to one another in a matrix direction;
   four openings (31*a*-31*d*) which allow communication between said first heat exchange chamber (69) and said second heat exchange chamber (73) and said second air inflow passage (57) and said second air outflow passage (59) are positioned in close proximity to one another in a matrix direction; and
   said eight opening/closing means (35, . . . , 47, . . . ) are each formed by a damper.

3. The humidity controller apparatus of claim 1, wherein said first air inflow passage (63) and said first air outflow passage (65) are arranged symmetrically with said second air inflow passage (57) and said second air outflow passage (59).

4. The humidity controller apparatus of claim 1, wherein said first heat exchanger (3) and said second heat exchanger (5) are provided in a refrigerant circuit (1) which performs a vapor compression refrigeration cycle by the circulation of a refrigerant therethrough such that refrigerant condensation and evaporation alternately occur in said first heat exchanger (3) and said second heat exchanger (5).

5. The humidity controller apparatus of claim 4, wherein dehumidifier means (80) for switching refrigerant circulation in said refrigerant circuit (1) and air distribution is provided so that moisture in a stream of air flowing through a refrigerant evaporating heat exchanger (3, 5) is adsorbed by the adsorbent material of said refrigerant evaporating heat exchanger (3, 5) while the adsorbent material of a refrigerant condensing heat exchanger (5, 3) is regenerated by the release of moisture therefrom to a stream of air flowing through said refrigerant condensing heat exchanger (5, 3), whereby the stream of air dehumidified by the adsorbent material of said refrigerant evaporating heat exchanger (3, 5) is supplied to an indoor space.

6. The humidity controller apparatus of claim 4, wherein humidifier means (81) for switching refrigerant circulation in said refrigerant circuit (1) and air distribution is provided so that moisture in a stream of air flowing through a refrigerant evaporating heat exchanger (3, 5) is adsorbed by the adsorbent material of said refrigerant evaporating heat exchanger (3, 5) while the adsorbent material of a refrigerant condensing heat exchanger (5, 3) is regenerated by the release of moisture therefrom to a stream of air flowing through said refrigerant condensing heat exchanger (5, 3), whereby the stream of air humidified by the adsorbent material of said refrigerant evaporating heat exchanger (5, 3) is supplied to an indoor space.

7. The humidity controller apparatus of claim 4, wherein:
dehumidifier means (80) for switching refrigerant circulation in said refrigerant circuit (1) and air distribution is provided so that moisture in a stream of air flowing through a refrigerant evaporating heat exchanger (3, 5) is adsorbed by the adsorbent material of said refrigerant evaporating heat exchanger (3, 5) while the adsorbent material of a refrigerant condensing heat exchanger (5, 3) is regenerated by the release of moisture therefrom to a stream of air flowing through said refrigerant condensing heat exchanger (5, 3), whereby the stream of air dehumidified by the adsorbent material of said refrigerant evaporating heat exchanger (3, 5) is supplied to an indoor space;

humidifier means (81) for switching refrigerant circulation in said refrigerant circuit (1) and air distribution is provided so that moisture in a stream of air flowing through a refrigerant evaporating heat exchanger (3, 5) is adsorbed by the adsorbent material of said refrigerant evaporating heat exchanger (3, 5) while the adsorbent material of a refrigerant condensing heat exchanger (5, 3) is regenerated by the release of moisture therefrom to a stream of air flowing through said refrigerant condensing heat exchanger (5, 3), whereby the stream of air humidified by the adsorbent material of said refrigerant evaporating heat exchanger (5, 3) is supplied to an indoor space; and said dehumidifier means (80) and said humidifier means (81) are configured to operate switchably between a dehumidification mode of operation and a humidification mode of operation.

* * * * *